US007019211B2

(12) United States Patent
Rose

(10) Patent No.: US 7,019,211 B2
(45) Date of Patent: *Mar. 28, 2006

(54) UNIVERSAL JUNCTION BOX

(76) Inventor: Frank P. Rose, 335 Sagamore Dr., Rochester, NY (US) 14617

( * ) Notice: Subject to any disclaimer, the term of this patent is extended or adjusted under 35 U.S.C. 154(b) by 0 days.

This patent is subject to a terminal disclaimer.

(21) Appl. No.: 11/139,381

(22) Filed: May 27, 2005

(65) Prior Publication Data
US 2005/0217887 A1 Oct. 6, 2005

Related U.S. Application Data

(63) Continuation of application No. 10/237,635, filed on Sep. 9, 2002, now Pat. No. 6,929,140.

(51) Int. Cl.
*H01H 13/04* (2006.01)
(52) U.S. Cl. .............................. 174/58; 174/54; 174/61; 248/906; 220/3.2
(58) Field of Classification Search ................. 174/58, 174/54, 61; 220/3.2, 3.7, 3.8, 4.02, 3.3–3.6; 248/906; 439/535
See application file for complete search history.

(56) References Cited

U.S. PATENT DOCUMENTS

| 2,297,862 A | 10/1942 | Bachmann |
| 2,378,861 A | 6/1945 | Peevey |
| 2,989,206 A | 6/1961 | McAfee |
| 3,197,548 A | 7/1965 | Weitzman et al. |
| 3,525,450 A | 8/1970 | Payson |
| 3,651,245 A | 3/1972 | Moll |
| 3,689,864 A | 9/1972 | Glader |
| 3,751,574 A | 8/1973 | Fisher |
| 3,878,315 A | 4/1975 | Blush |
| 3,926,330 A | 12/1975 | Deming et al. |
| 3,955,701 A | 5/1976 | Fisch |
| 4,000,874 A | 1/1977 | Finley et al. |
| 4,248,459 A | 2/1981 | Pate et al. |
| 4,403,708 A | 9/1983 | Smolik |
| 4,569,458 A | 2/1986 | Horsley |
| 4,599,485 A | 7/1986 | Smolik |
| 4,634,015 A | 1/1987 | Taylor |
| 4,757,908 A | 7/1988 | Medlin, Sr. |
| 4,927,039 A | 5/1990 | McNab |
| 5,031,789 A | 7/1991 | Dauberger |
| 5,042,673 A | 8/1991 | McShane |
| 5,117,996 A | 6/1992 | McShane |
| 5,280,132 A | 1/1994 | Clarey et al. |
| 5,289,934 A | 3/1994 | Smith et al. |
| 5,354,953 A | 10/1994 | Nattel et al. |

(Continued)

*Primary Examiner*—Dhiru R. Patel
(74) *Attorney, Agent, or Firm*—Brian B. Shaw, Esq.; Stephen B. Salai, Esq.; Harter, Secrest & Emery LLP

(57) ABSTRACT

A universal junction box, which includes multiple methods for securing cables, various kinds of wires and conduits and multiple methods for securing the box within a wall cavity. The front side of the box which can be positioned flush with the installed wall covering includes fittings for attaching a wall plate, switches, plugs, connectors, and electrical/electronic devices to the box. The junction box allows the addition of an extension to the rear of the junction box for a between-wall design for the installation and attachment of similar devices on an opposing wall surface through the same junction box. The junction box also engages extensions to the side of the junction box allowing two or more ganged box configurations, which share the multiple methods for securing the junction box within a wall cavity.

10 Claims, 28 Drawing Sheets

U.S. PATENT DOCUMENTS

| | | |
|---|---|---|
| 5,402,902 A | 4/1995 | Bouley |
| 5,405,111 A | 4/1995 | Medlin, Jr. |
| 5,445,539 A | 8/1995 | Dale |
| 5,471,013 A | 11/1995 | Marchetti |
| 5,480,053 A * | 1/1996 | Jorgensen .................... 220/62 |
| 5,646,371 A | 7/1997 | Fabian |
| 5,659,151 A | 8/1997 | Dale |
| 5,661,264 A | 8/1997 | Reiker |
| 5,680,947 A | 10/1997 | Jorgensen |
| 5,717,164 A | 2/1998 | Shetterly |
| 5,833,110 A | 11/1998 | Chandler et al. |
| 5,912,431 A | 6/1999 | Sheehan |
| 5,929,378 A | 7/1999 | Guisti |
| 5,967,354 A | 10/1999 | Whitehead et al. |
| 5,988,421 A | 11/1999 | Jorgensen |
| 6,045,374 A | 4/2000 | Candeloro |
| 6,091,023 A | 7/2000 | O'Donnell |
| 6,107,568 A | 8/2000 | Schnell et al. |
| 6,111,197 A | 8/2000 | Layne |
| 6,147,306 A | 11/2000 | Wilkins |
| 6,188,022 B1 | 2/2001 | He |
| 6,207,894 B1 | 3/2001 | Reiker |
| 6,232,553 B1 | 5/2001 | Regan |
| 6,234,829 B1 | 5/2001 | Thomsen |
| 6,242,696 B1 | 6/2001 | Reiker |
| 6,265,657 B1 | 7/2001 | Layne |
| 6,300,567 B1 | 10/2001 | Hayduke et al. |
| 6,303,859 B1 | 10/2001 | Reiker |
| 6,311,229 B1 | 10/2001 | Burchard et al. |
| 6,311,637 B1 | 11/2001 | Moss |
| 6,317,028 B1 | 11/2001 | Valiulis |
| 2001/0023772 A1 | 9/2001 | Layne |

* cited by examiner

INSERT

HOLD

INSERT FIGURE 17b

HOLD

INSTALL

United States Patent — US 7,019,211 B2

UNIVERSAL JUNCTION BOX

CROSS-REFERENCE TO RELATED APPLICATIONS

The present application is continuation of U.S. application Ser. No. 10/237,635, filed Sep. 9, 2002, now U.S. Pat. No. 6,929,140, issuing Aug. 16, 2005.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates generally to an apparatus and method for securing cables, wires conduits, and junction boxes within a wall cavity and more particularly junction boxes for terminating electrical circuits on the surfaces of walls, floors, ceilings, or equipment enclosures for both high and low voltage circuits.

2. Background

Electrical junction boxes, also sometimes referred to as outlet boxes, have been used since the advent of electricity in high voltage circuit applications and later with the advent of the telephone in low voltage applications. These boxes are generally mounted with the front side of the box positioned flush with the installed wall covering material and include fittings for attaching a wall plate, switches, plugs, connectors, and electrical/electronic devices to the box. The box also provides a means for connection of cables and conduits within the box or termination of cables to apparatus mounted within the box.

The use and design of junction boxes has progressed as technology has changed and as new applications were needed. With these advances, several products became available that solved each application related problem individually while requiring, in some cases, a multitude of boxes. With these varying designs many problems persist, and limited use of special features precludes production of the units in high volume thereby increasing manufacturing and end-user costs. Further, these and other problems persist resulting in unwieldy inventories for manufacturers, distributors, suppliers and installers alike. In addition, the units provided for sale often lack the most efficient design due to an attempt to provide a product, which has a more general application but, in many cases, doesn't solve any particular application well. For example, current boxes each must be mounted in a particular way due to their uni-functional design that requires the box be oriented a particular way to allow the mounting features to be effective.

Low voltage cables tend to be more fragile than high voltage cables. Because of on-going technology advancements and the need to increase bandwidth capacity of low voltage cables, low voltage cables are becoming even more fragile than previous cables. In order to prevent loss of bandwidth capacity, kinking or excessive bending of these cables should be avoided. When installing low voltage circuits, the current practice is for installers to cut the back off a standard high voltage electrical junction box. The new opening allows the necessary bending radii for the low voltage cables and, also, allows the mounting of low voltage apparatus, which often fills all of the space inside the junction box. The edges of standard electrical junction boxes can damage fragile cables when they are pulled through the openings. Installers usually do not have enough room inside standard junction boxes to coil multiple cables during the wall installation phase of construction. The aforementioned installation approach does not provide adequate protection or a neat method for holding the cables in place. Consequently, the cables stored in such a cramped, unorganized fashion are subject to damage after they are installed prior to completion of the construction phase. Further, the current practice does not provide a convenient way to secure an extra long service loop, which would allow easy connection of very small, intricate terminating devices.

High voltage cables commonly used for 120-volt outlets and lighting circuits range from two #14 conductors with a ground wire to three #12 conductors with a ground wire. As a result, the cable diameter between the two extremes can vary by as much as three times in size. Junction boxes are used to connect the circuits and mount electrical terminating devices such as outlets, switches and lighting fixtures. To facilitate these circuits, multiple openings for the cables to enter the box are required and because of limited space within the box, each opening is sized to accommodate both cable size extremes.

Methods for securing these cables within the junction box are determined by the National Electric Code (NEC). The NEC requires high voltage cables to be anchored no greater than four inches from junction boxes without a cable-securing device and 8 inches when a cable-securing device is provided. In applying these codes, multiple gang and wall boards mounted junction boxes would normally require a cable-securing device to anchor the cable would be more than 4 inches away, whereas a single junction box mounted to a framing structure is within four inches. Underwriting Laboratory (UL) certification testing for the securing device is also required. The UL test for the securing device requires the cable entering the bottom of the box to be subjected to a direct vertical pull of 25 pounds for 5 minutes in a conditioned environment of minus 20 degrees centigrade without damage to the cable sheath or conductors and a displacement of the cable of more than ⅛ inch.

Although high voltage cables tend to be more robust than low voltage cable because of the cable sheaths and wire insulation used, they can be subjected to damage when placed in the junction box. The current art available either provides no anchoring devices with an opening sized for the largest cables or provides inadequate clamping designs. The clamping designs either provide insufficient clamping of the smaller cables or provide too much clamping for the larger cables potentially damaging the cable and making it difficult pulling any size cable into the box difficult.

As a result of these and other problems there is a need for a universal junction box that includes a cable-securing device with the capability to handle both low voltage and high voltage cable in a safe and effective manner. A universal junction box is needed that can be easily mounted in a multitude of environments and orientations and reduces wall clutter while making efficient use of the available wall space. The universal junction box of the present invention increases the ease of installation by allowing easy mounting in many places and provides sufficient anchoring of all sizes of cables and commonly used flexible conduits while not causing damage to any of them. This invention reduces costs while producing installation efficiencies and reducing junction box inventories.

SUMMARY OF THE INVENTION

In accordance with the invention, a universal junction box for low and high voltage cable that allows easy installation. The universal junction box has a body with a continuous peripheral wall having an internal and an external side such that the external side encompasses a mounting tab including a frangible seam, a slanted fastening aperture and a mounting aperture, and the internal side including an integral fastening lug, the fastening lug defining a cylindrical fastener-engaging cavity dispersed within the interior of the peripheral wall.

BRIEF DESCRIPTION OF THE DRAWINGS

In the detailed description of the preferred embodiments of the invention presented below, reference is made to the accompanying drawings in which;

FIGS. 17a–d are a partly cut away front perspective view of the slanted cable attachment embodiment of the invention shown in FIG. 15;

DESCRIPTION OF INVENTION

Figure 1:
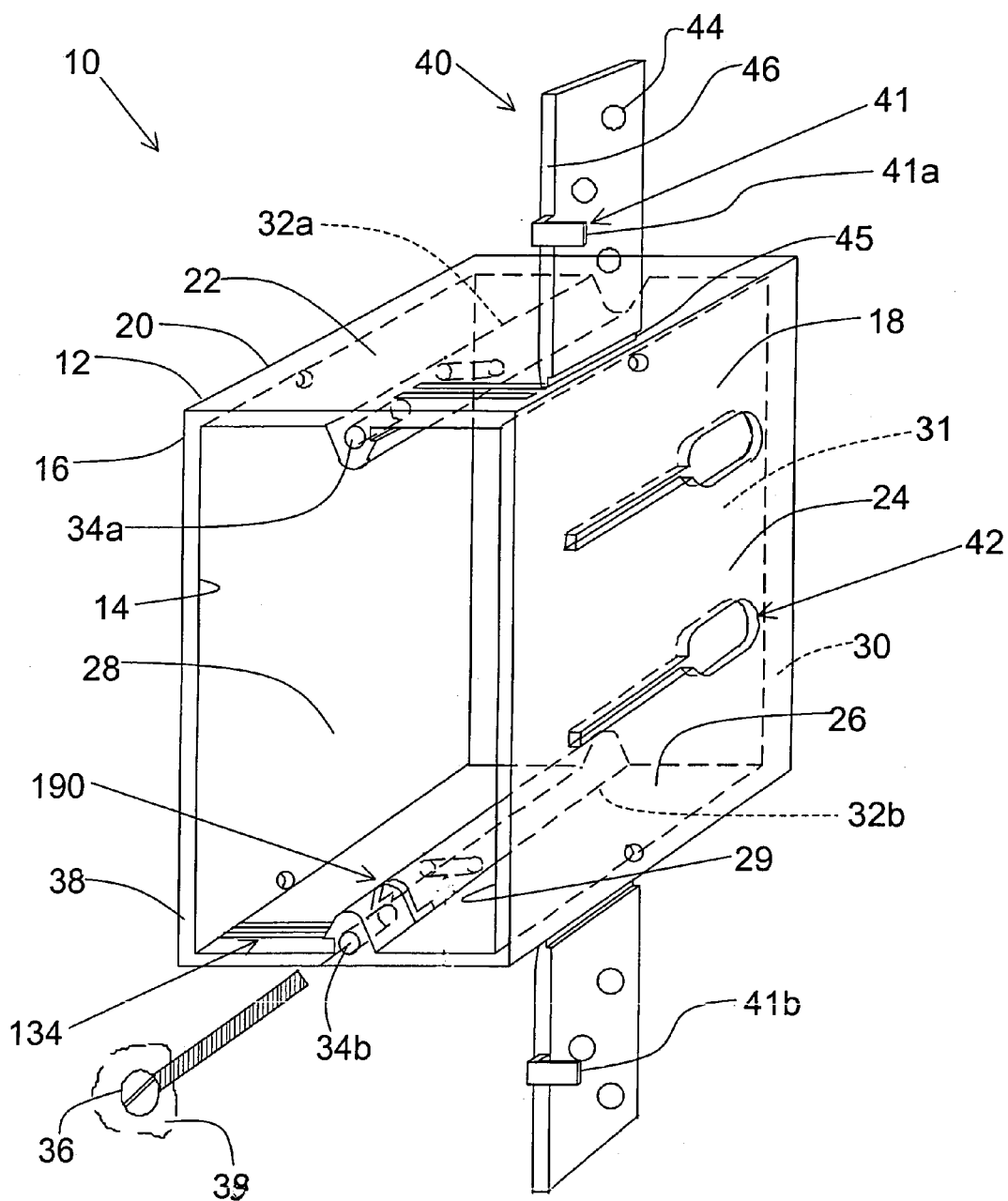
FIG. 1 is a front perspective view of the universal junction box in accordance with the first group of invention embodiments for securing the box within a wall cavity and other high and low voltage common elements.

The present description will be directed in particular to elements forming a part of, or in cooperation more directly with, the apparatus and method in accordance with the present invention. It is understood that elements not specifically shown or described may take various forms well known to those skilled in the art. Referring now to the drawings where like reference numerals represent similar or corresponding parts throughout several views.

FIG. 1 is a schematic of a universal junction box (10) showing a front perspective view with various attachments for securing the box (10) within a wall cavity including common features shared between high and low voltage designs. The universal junction box (10) may be made of plastic or metal. In one preferred embodiment, the universal junction box (10) is made from moldable plastic, such as polystyrene or the like, which makes the box easy to manufacture using standard injection molding techniques.

The universal junction box (10) includes a continuous peripheral wall (12) with an internal side (14) and an external side (16) and at least one planar facet (18). The box (10) generally has a rectangular body (20) having a top (22), a first side (24), a bottom (26), and a second side (28). The box (10) defining a front opening (29) and a planar facet or back (30) that can include a back portion (31) so that the back may be open or closed as needed. In some instances, such as high voltage applications, the back portion (31) would be closed to accommodate the required safety features for high voltage applications. In other situations, such as in low voltage applications, the back of the box would be open to allow additional accessibility.

The internal wall (14) may include an integral fastening lug (32) defining a fastening cavity (34), such as a cylindrical fastener-engaging cavity. The top and bottom (22, 26) of the body (20) includes the integral fastening lug defining cavities (34a, 34b) into which one or more fasteners (36), such as mounting screws, are inserted through a device or faceplate. The cavities (34a, 34b) may be threaded or they may be manufactured in sizes such that insertion of a self-tapping screw will form threads in the cavity, also referred to as a channel. The fasteners (36) secure a device/faceplate 39 to a front planar surface a or front face (38) of box (10). The device/face plate (39), also known as a faceplate, can include an electrical cover plate, switch plate, switch, plug, connector, another device such as an electrical device and another universal box or portion of one, such as a front extension.

Also shown in FIG. 1 are the mounting features for securing the box (10) within a wall cavity by one or more various schemes including a mounting tab (40) with an alignment tab (41) attached and a mounting aperture component (42) that allows the box (10) to be adjusted and removed. The mounting tab (40) is attached along an edge of first side (24) and in effect is an extension of the plane of the first side so it mounts the box (10) to a wood or steel structural member (not shown in FIG. 1) such that the mounting tab (40) extends vertically, perpendicular to the top or bottom of the box (10). The mounting tab (40) includes one or more apertures (44) for insertion of a standard screw to mount the box (10) to a structural member. The mounting tab (40) also has a frangible breakaway seam (45), which allows the mounting tab to be easily removed, resulting in an unencumbered external box (20) surface for other junction box applications where the mounting tab (40) is not needed. As shown in FIG. 1 there preferably are two mounting tabs that extend perpendicular to both the top and bottom respectively of the box wherein a front edge of the (46) of each mounting tab (40) is set ¾ inches from the front face (38) of the box.

FIG. 1 shows the alignment tab (41) that is used to align the box (10) to the required wallboard depth. The alignment tab (41) extends from the front edge (46) of the mounting tab (40) such that it is perpendicular to that edge (46) with a gap of about ¼". This sets the alignment tab about ½ inch from the front planar surface or front face (38) of the box. As the alignment tab is perpendicular to the front edge 46 of the mounting tab, it also is perpendicular to the plane of the first side (24). FIG. 1 also shows that the alignment tab (41) is oriented so it is parallel the plane of the front face (38) of the box. The alignment tab (41) facilitates setting the box (10) by presetting the set back depth. For instance, if the set back depth needs to be ½" from the front surface (38), for the most commonly used wallboard, then the alignment tab having a ½" setback can be utilized for alignment of the box (10), as is. In this respect the engagement of the alignment tab (41) with a structural member will extend the front surface (38) of the box ½ inch forward from the structural member. This forward set will allow the front face (38) of the box to be flush with the surface of a ½ inch thick wall board that is later attached to the structural member. If the front face (38) must be set back ¾", as for the next most commonly used wallboard, then the alignment tab (41) is first removed from the mounting tab (40) to allow alignment of the box (10) for the ¾" wallboard using the front edge (46) of the screw mounting tab (40), which as noted above, is set back ¾ inch from the plane of the front face (38).

The alignment feature provided by having the alignment tabs (41) extending from the mounting tab (40) provides for greater stability than is currently the practice while the box (10) is being attached. This is particularly the case with two alignment tabs extending from the mounting tabs as shown because this spaces the alignment tabs (41a, 41b) outboard of the box and farther apart which helps to prevent the junction box from rocking during installation. There is no need for visual validation of alignment marks that are commonly used on current boxes for this purpose. There are other mounting features shown in FIG. 1 that are possible because of the unencumbered external surface that this invention provides, when each mounting tab (40) is removed (along with the associated alignment tab) by breaking it off at the frangible seam (45). That is, if the mounting tabs (40) are removed, the box still can be attached to a structural member by the mounting aperture component (42).

Mounting Aperture Component

An adjustable junction box feature allows for reposition of the box for variations caused by wall material (such as tile) added after installation of the original wallboard. Current designs in the art provide adjustable attachment through an adjustment screw that threads through a steel bracket, which is then attached to the junction box. This type of design involves multiple parts. This adjustable feature allows horizontal adjustment of the box to compensate for the additional depth of new wall covering, thus making the box flush with the new wall covering-material.

Figure 2:
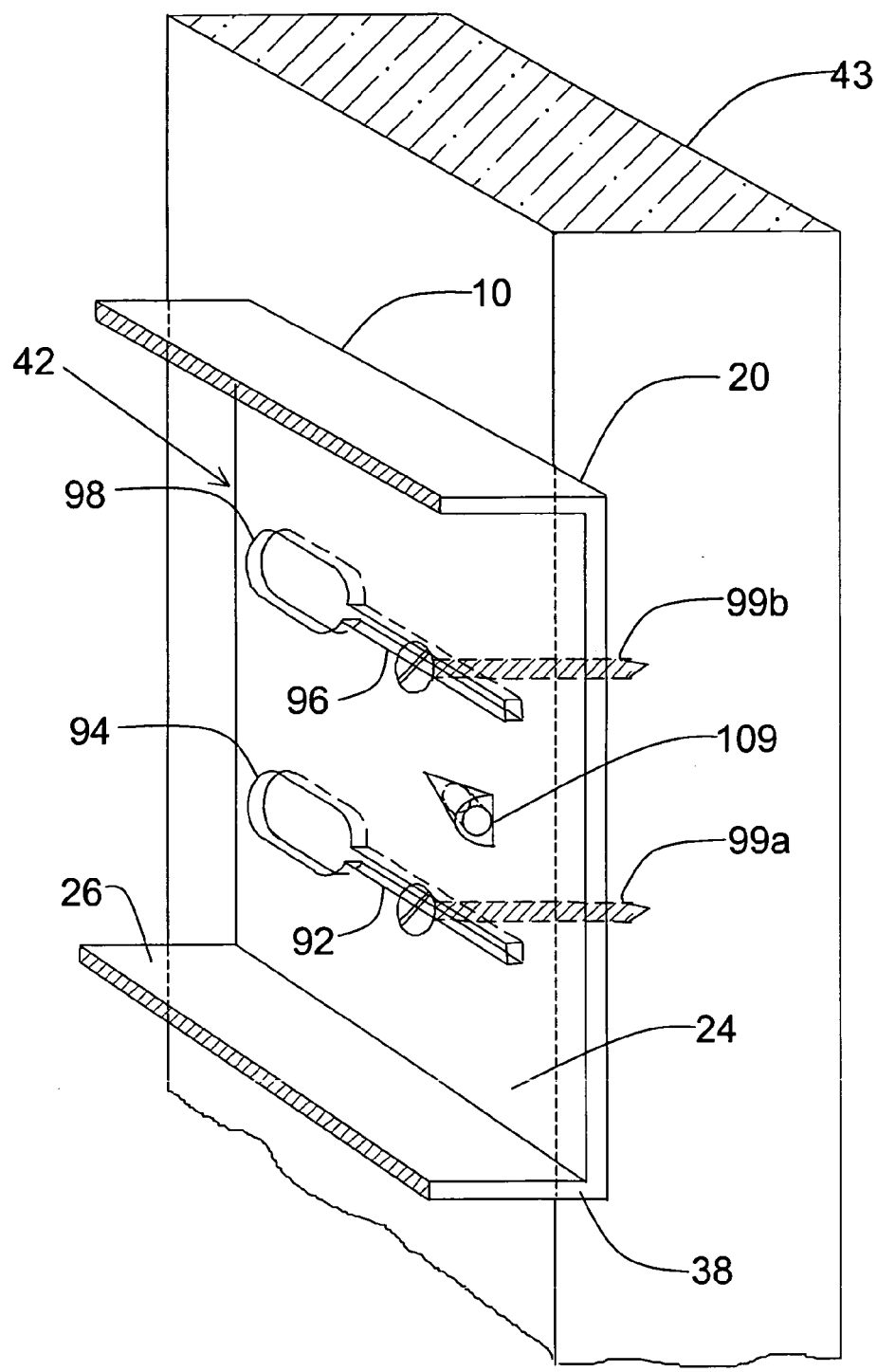
FIG. 2 is a partly cut away perspective view of the universal junction box in accordance with the adjustable and removable attachment embodiment of the invention.

In FIG. 2 the mounting aperture component (42) is illustrated in a partly cut-away perspective view of the body (20) of the first side (24) of the universal junction box (10) shown. The mounting aperture component (42) allows the box (10) to be repositioned for variations caused by wall material (such as tile) added after installation of the original wallboard. The mounting aperture component (42) also allows the box (10) to be removed after the wallboard is installed thereby allowing easy access and use of the wall cavity for later installations, replacements and modifications of low voltage devices that would not otherwise fit in the box and, therefore, require access to the wall opening. These devices could include video splitters, video modulators, audio amplifiers, batteries and the like.

The mounting aperture component (42) is located within the first side (24) of box (10) and consists of a first channel (92) terminating at a bulbous aperture (94) and a second parallel channel (96) terminating at a second bulbous aperture (98). Box (10) would be attached by installing fasteners, such as screws (99a, 99b) partially into the structural member (43) and then placing the bulbous apertures (94, 98) over the head of screws (99a, 99b), respectively, and pushing the box (10) inward so that the screws slide into and along the parallel channels (92, 96). Once the box (10) is in place, screws (99a, 99b) would be tightened down.

After the final wall material is installed, screws (99a, 99b) would be loosened and the box (10) would be moved forward or backward so that the front face (38) of the body (20) is flush with the wall covering material, after which the screws (99a, 99b) can be retightened to secure the box (10) to the structural member (43). To remove box (10) after wall material is installed would encompass loosening screws (99a, 99b) slightly and sliding the box (10) forward so that the heads of screws (99a, 99b) enter into the space of to the bulbous apertures and tilting the box away from screws (99a, 99b) to disengage the box (10) from structural member (43), and then remove the boxes from the wall cavity.

Figure 3:
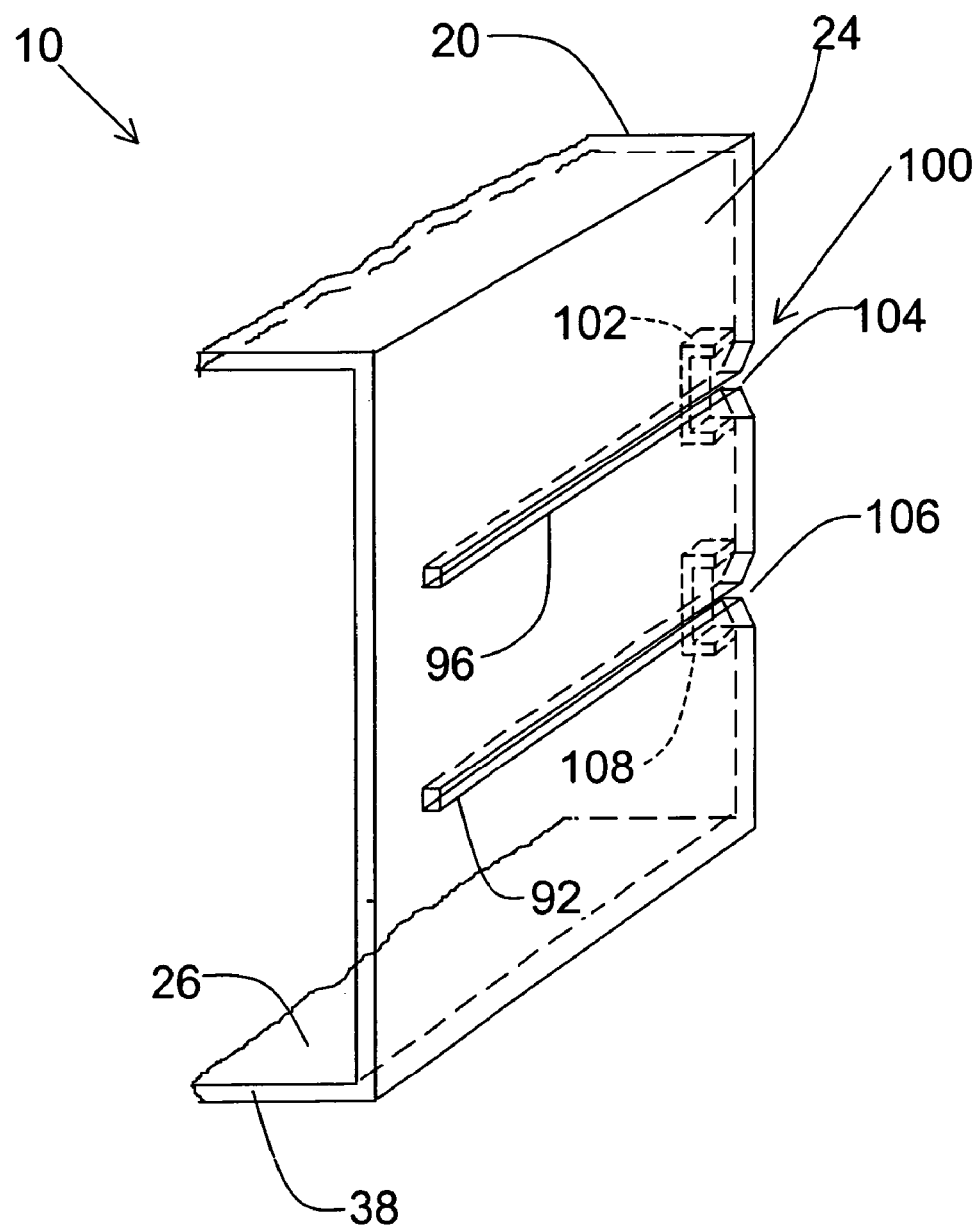
FIG. 3 is another embodiment of the adjustable and removable attachment embodiment shown in FIG. 2 of the invention.

FIG. 3 shows an alternative embodiment of a mounting aperture component (100). In this embodiment the bulbous apertures (94, 98) are replaced with a first bridge brace (102) and a first flared opening (104), and a second flared opening (106) and a second bridge brace (108). Box (10) would be attached by installing screws (99a, 99b) partially into a structural member (43) and then sliding the flared openings (104, 106) over the head of screws (99a, 99b), respectively, and pushing the box (10) inward so that the screws slide into parallel channels (92, 96). Once the box (10) is in the proper position, screws (99a, 99b) would be tightened down, thus securing the box (10) so that the front face (38) of the box (10) is flush with the new wall covering material.

Referring to FIG. 2 which shows an optional securing feature that allows a screw to be inserted through the first side (24) into the structural member (43). This feature is provided by cavity (109) embedded within first side (24), which is angled to allow a screw to enter the structural member (43) from the inside of box (10) at an angle. This feature can be added to a box having either the mounting aperture component (42) of FIG. 2 or the alternative mounting aperture component (100) of FIG 3. This allows an installer to toe a fastener such as a screw through the box and into a structural member to secure the box (10) in a desired position, by use of a common screwdriver applied at an angle from the front (38) of the box (10) rather than using an offset tool to tightening down screws (99a, 99b).

The mounting aperture component (42) allows the box (10) to be easily adjusted without the need to purchase special parts to facilitate this function. The mounting aperture component (42) also allows the box (10) to be easily removed after the wallboard is installed, thereby allowing use of the wall cavity for other purposes. The mounting aperture also allows easy access to cables within the wall cavity.

Nail Attachment

Current designs in the art provide nail-mounting features on the exterior of the box through various clamping methods to hold the attachment nail in place. Further, these current designs require the nail to be included during the manufacturing process because insertion and removal of the nail is not easily facilitated. The current art has several drawbacks, which include complicated designs requiring additional material to form the nail-clamping device, which adds unnecessary cost for mold tooling and extra material to form the nail-clamping feature.

Figure 4:
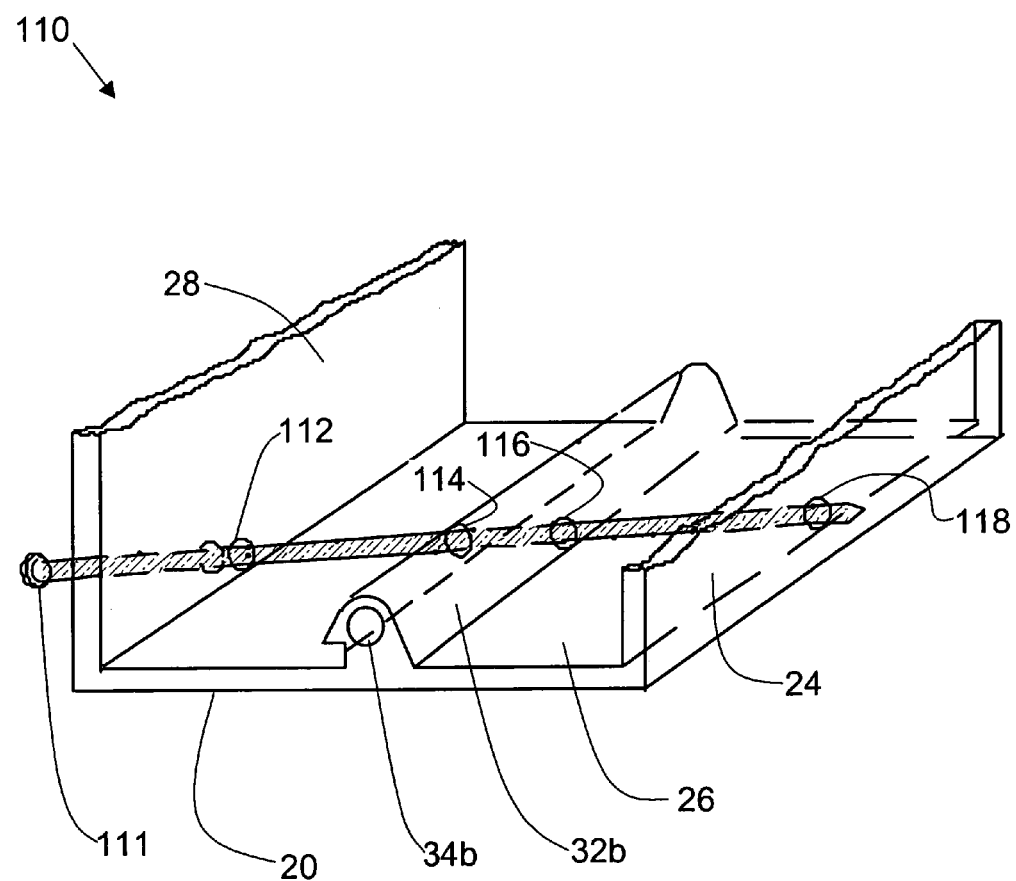
FIG. 4 is a partly cut away perspective view of the universal junction box in accordance with the nail attachment embodiment of the invention.

FIG. 4 shows a nail attachment feature (110) of the universal junction box (10) in a front perspective view. FIG. 4 shows how the nail attachment feature (110) is used to mount the box (10) to a wood structural member (43). Preferably the nail attachment feature (110) would be located at the top (22) and bottom (26) of the body (20) which allows the insertion of a fastener (111) such as a #12 common nail or a long shank screw. The fastener (111) holds the box (10) in place with the aid of the exterior sides (24, 28) and the fastening lug (32b). The fastener (111) is inserted through apertures (112, 114, 116, 118) which can be aligned or staggered (slightly off center). By offsetting the apertures, the fastener (111) enters the apertures off-center taking advantage of the squeeze and flex afforded by a plastic design, resulting in tighter alignment and more secure installation of the box to the structural member, resulting in an unencumbered external box (20) surface for other junction box applications. If required for Underwriting Laboratory (UL) certification for high voltage applications, a surrounding plastic sleeve can be used to cover the exposed nail portions inside the box (10).

Wallboard Attachment Component

Current designs in the art provide wallboard attachment through a clamping screw with a narrow-finger that swings-out on the end of the screw to clamp the wallboard between the face of the finger and a flange on the front surface of the box. The current art has several drawbacks, which include a multi-piece design, irregular cutouts in the wallboard to insert and mount the junction box, templates to mark the wallboard cutout, and very little area for stable wallboard surface retention which can cause the junction box to rock within the wallboard cut-out if incorrectly installed.

Figure 5A:
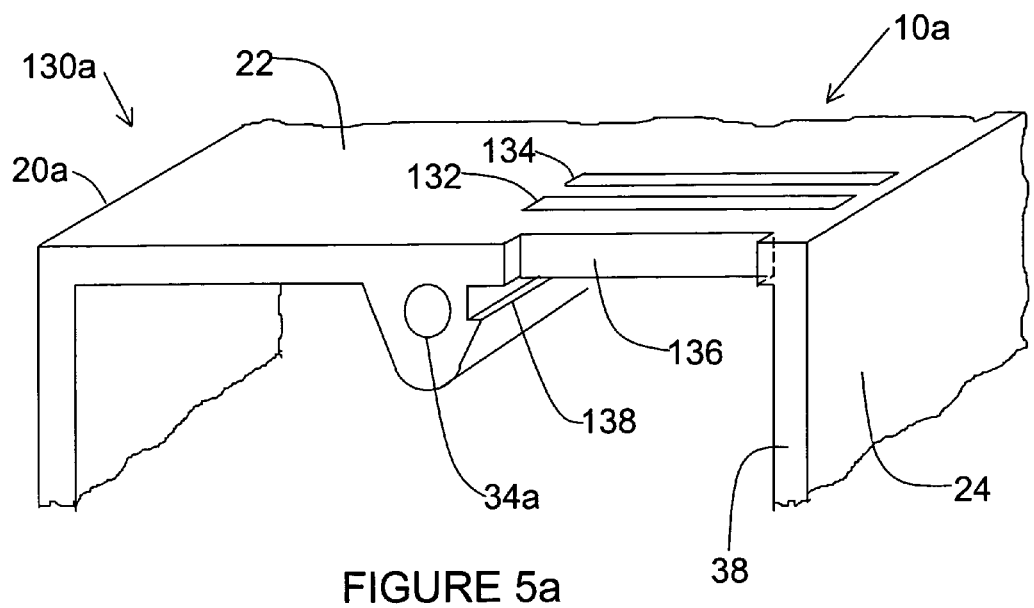
FIG. 5a–5c show a partly cut away perspective view of the universal junction box in accordance with the wallboard attachment embodiment of the invention including the attachment clip.
Figure 5B:
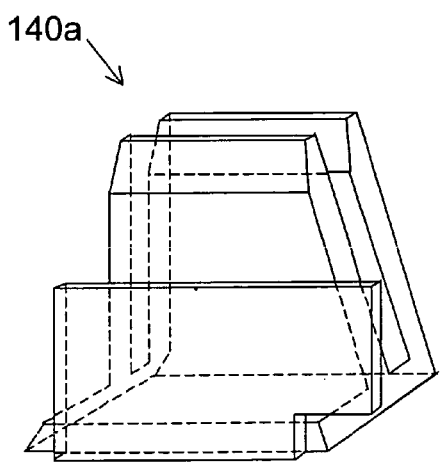
Figure 5C:
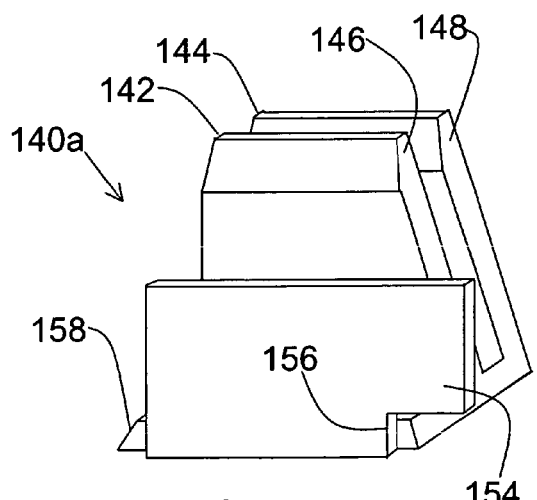

FIGS. 5a, 5b and 5c show a universal junction box (10a) with a wallboard attachment component (130a) for mounting the box (10a) to a wall-covering surface, such as wallboard. FIGS. 5a, 5b and 5c include slots 132, 134 and a frontal surface indent (136) in box (10a) and a cut-out (156) in the front (154) of the clip (140a). The wallboard attachment component (130a) is illustrated in a front perspective view of the universal junction box (10a) shown. The wallboard attachment component (130a) is preferably located on the top (22) and bottom (26) of the box (10a) at diagonally opposing corners for attachment to the wallboard. Clip (140a) includes two fingers (142, 144) for two different wallboard sizes, such as ½ inch and ¾ inch, which are the most commonly used over a framing structure. In this example, the inside finger (142) would be for the ½ inch wallboard and outside finger (144) would be used for ¾ inch wallboard.

When attaching the box (10a) to the smaller size wallboard, the clip (140a) would not require modification and would be inserted in slots (132, 134). For the larger size wallboard the inside finger (142) would be clipped off with electrical diagonal pliers. Clip (140a) can be metal or plastic and sold separately. Alternatively, the plastic clip can be molded as a breakaway design attached to the screw mounting tab (40). The clip (140a) would be installed by placing the angular tip (158) in channel (138) and inserting fingers (142, 144) through slots (132, 134), respectively, causing the clip to engage the wallboard, and then further pushing the clip to fully locked position whereby the notch (156) at the front of the clip (154) snaps into the locking notch (136) to secure the clip (140a) in place.

Figure 6A:
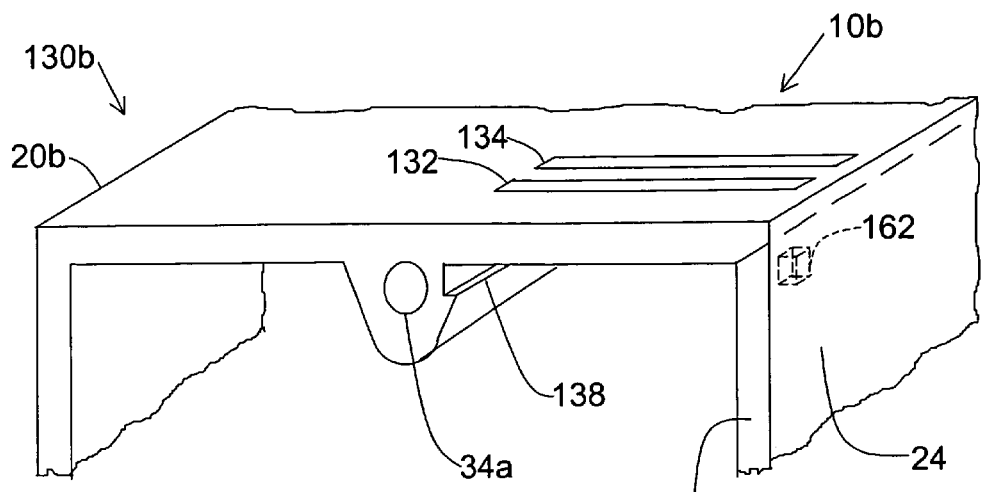
FIG. 6a–6c shows another embodiment of the wallboard attachment component shown in FIG. 5 of the invention.
Figure 6B:
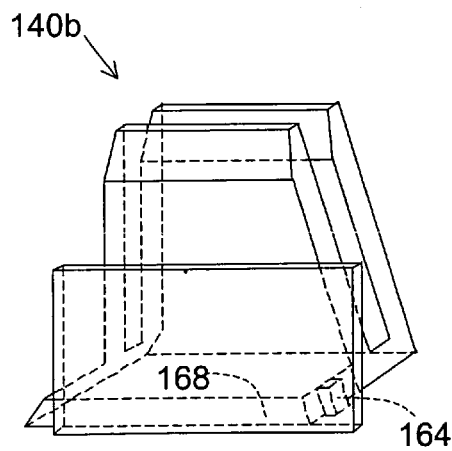
Figure 6C:
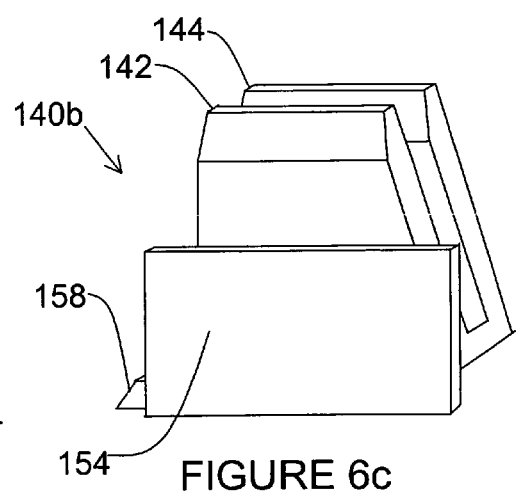

FIGS. 6a, 6b, and 6c show a universal junction box (10b) with a wallboard attachment component (130b) for mounting the box (10b) to a wall covering surface, such as wallboard. FIGS. 5, 6, and 7 are variations on the same wallboard attachment component (130) feature with different methods for securing the clip in place. FIG. 6 includes an interior side indent (162) and a tab (164) extending from the base (168) of the clip (140).

FIGS. 6a, 6b, and 6c show an alternative embodiment of the wallboard attachment component (130b) feature. FIG. 6 is substantially similar to FIG. 5, except that the clip retaining mechanism is different. The clip (140b) would be installed by placing the angular tip (158) in channel (138) and inserting fingers (142, 144) through slots (132, 134), respectively, causing the clip to engage the wallboard and then further pushing the clip to fully locked position whereby the tab (164) extending from the base (168) of the clip (140b) snaps into the interior locking sidewall indent (162) to secure the clip (140b) in place.

Figure 7A:
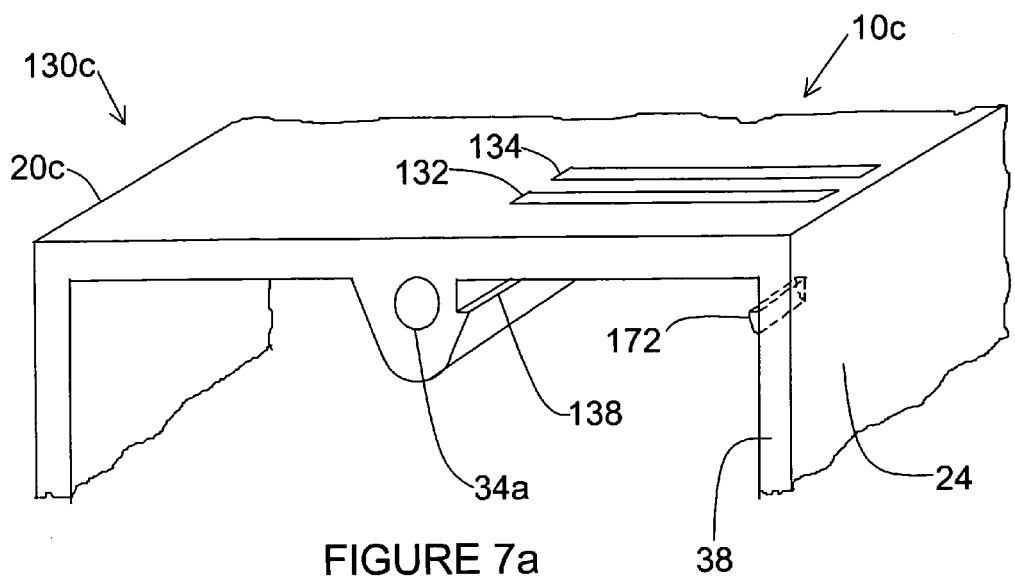
FIG. 7a–7c shows another embodiment of the wallboard attachment component shown in FIG. 5 of the invention.
Figure 7B:
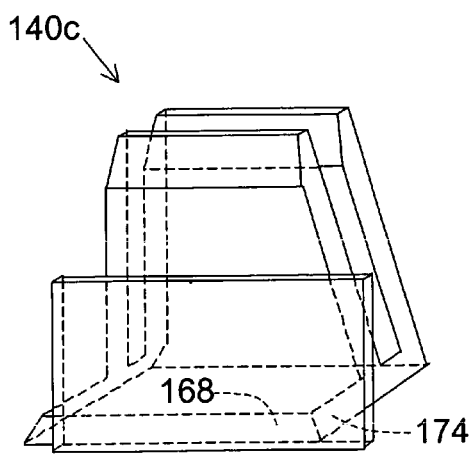
Figure 7C:
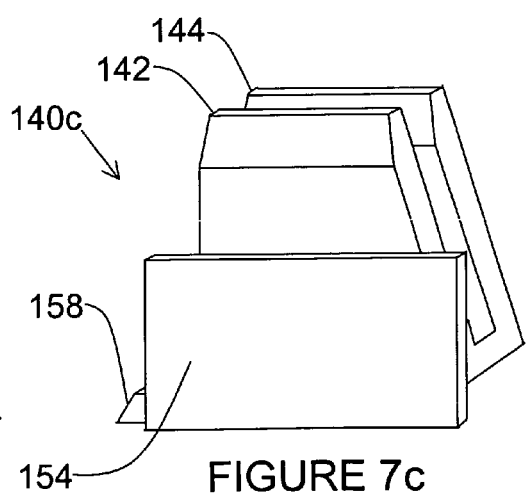

FIGS. 7a, 7b, and 7c show a universal junction box (10c) with a wallboard attachment component (130c) for mounting the box (10c) to a wall covering surface, such as wallboard. FIGS. 5, 6, and 7 are variations on the same wallboard attachment component (130) feature with different methods for securing the clip in place. FIG. 7 includes an interior side-wall snap-over tab (172).

FIG. 7 shows an alternative embodiment of the wallboard attachment component (130c) feature. FIG. 7 is substantially similar to FIG. 5, except that the clip retaining mechanism is different. The clip (140c) would be installed by placing the angular tip (158) in channel (138) and inserting fingers (142, 144) through slots (132, 134), respectively, causing the clip to engage the wallboard, and then further pushing the clip to fully locked position whereby the tapered end (174) at the base (168) of the clip (140c) snaps over the locking tab (172) located in the interior face of the first side (24) to secure the clip (140c) in place.

Figure 8A:
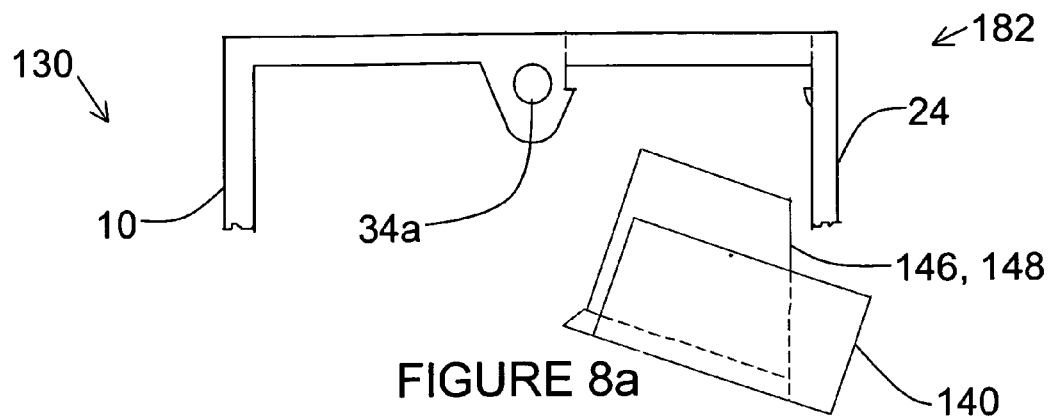
FIG. 8a–8c shows a front elevation of the clip installation for the wallboard attachment components shown in FIGS. 5, 6 and 7 of the invention.
Figure 8B:
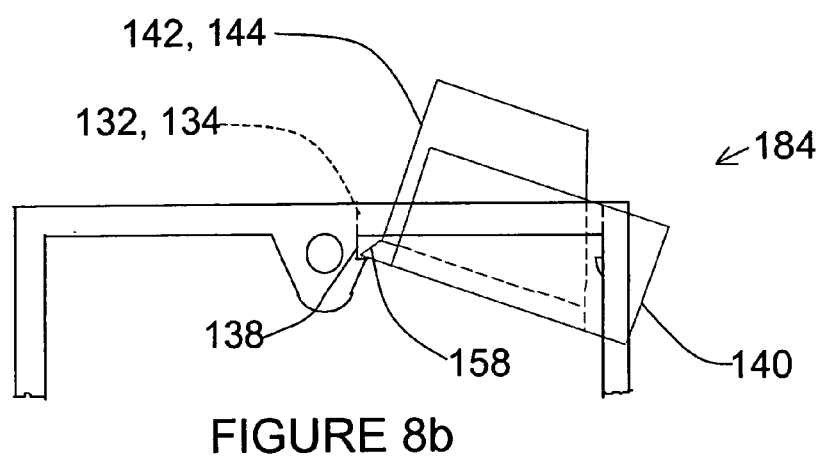
Figure 8C:
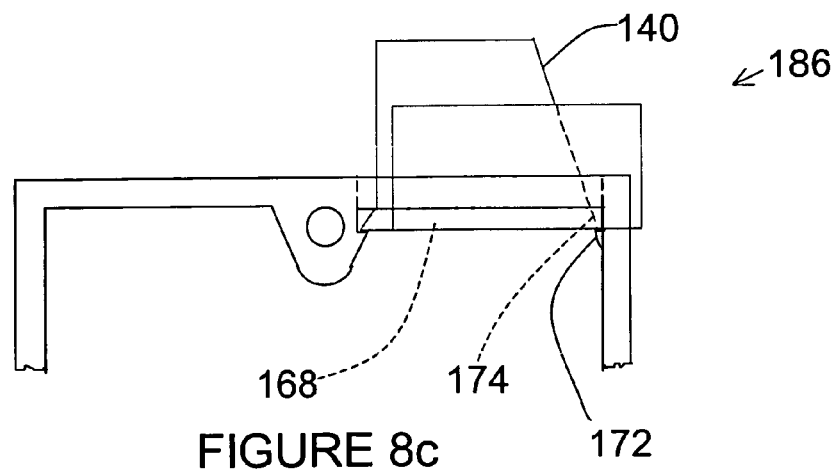

FIGS. 8a, 8b, and 8c show the method of installing the clip on the universal junction box (10). FIG. 8 shows a front elevation of the box (10) top section and shows the general method of installing any of the clips (140) presented in FIGS. 5, 6 and 7. FIG. 8 illustrates an example of the clip locking method discussed in conjunction with FIG. 7. Three views (182, 184, 186) are shown to represent the three stages of installing clip (140) for mounting the box (10) to wallboard. The first installation step is presented in view (182). Clip (140) is positioned so its angular portion (146, 148) is parallel to first side (24) of box (10). The second installation step is presented in view (184) where clip (140) is positioned so the angular tip (158) of the clip (140) is placed in channel (138) of box (10) and fingers (142, 144) are inserted through slots (132, 134), respectively, causing the clip to engage the wallboard. The last installation step is presented in view (186) where clip (140) is positioned in the fully engaged position by pushing the clip (140) to the fully locked position whereby the end (174) at the base (168) of the clip (140) snaps over the locking tab (172) to secure the clip (140) in place.

The advantages of the wallboard attachment component (130) and clip (140) include: fast and easy insert, push and snap installation of the box (10); an uncomplicated all-plastic design; an unencumbered external frontal surface which allows the front of box itself to serve as the template for marking a simple rectangular cut-out area in the wallboard; and an attachment design which prevents the rocking of the outlet within the cut-out because of the large surface retention area on both sides of the wallboard provided by the clip (140).

Pull String Anchor

There are situations during an electrical installation where there is a need to install and store a pull string which allows cables to be pulled into the junction box at a later date. The current practice is to either coil up or tape the string inside the junction box. In these situations, a device to anchor the pull string would be beneficial to prevent accidental removal of the string prior to future installation of the cable. This feature also provides a method to anchor the string in a secure, permanent fashion, versus the use of tape or other fastener, which could loosen with age.

Figure 9:
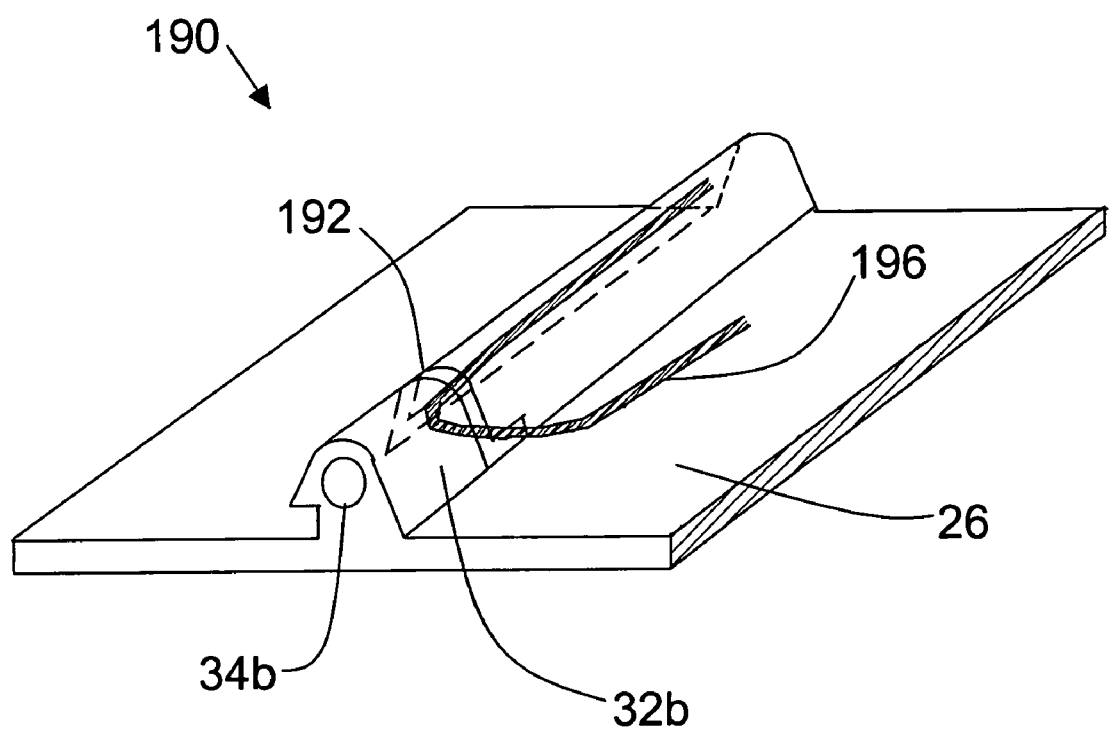
FIG. 9 is a partly cut away perspective view of the universal junction box in accordance with the pull string anchor embodiment of the invention.

In FIG. 9, the pull string anchor (190) is illustrated in a front perspective view of the universal junction box (10) shown. The pull string anchor (190) would be located on the inside of the box (10) at the top (22) and bottom (26). A perpendicular slot (192) is located within the fastening lug (32), which allows a pull element (196), including a pull string (196), to be anchored.

An advantage of the universal junction box (10) with the pull string anchor (130) includes being able to anchor a cable pull string and prevent accidental removal of the string prior to future installation of the cable. It also provides a method to anchor the string in a permanent fashion.

Rear Extension Box

With the advent of several low voltage boxes installed for telecommunication needs such as telephones, computers, video, audio and the like, in addition to standard high voltage boxes for plugs and switches, wall space available to install all the necessary junction boxes has been reduced. In walls shared between rooms, this problem is further compounded because a single box mounted on one wall precludes a box mounted on the opposing wall surface in the same place and, therefore, makes it difficult to place a box in the most desirable location. As a result of the foregoing, there is a need for a junction box that can be installed in a common wall between rooms allowing access to directly opposing wall surfaces through the same junction box thereby freeing wall space.

Figure 10:
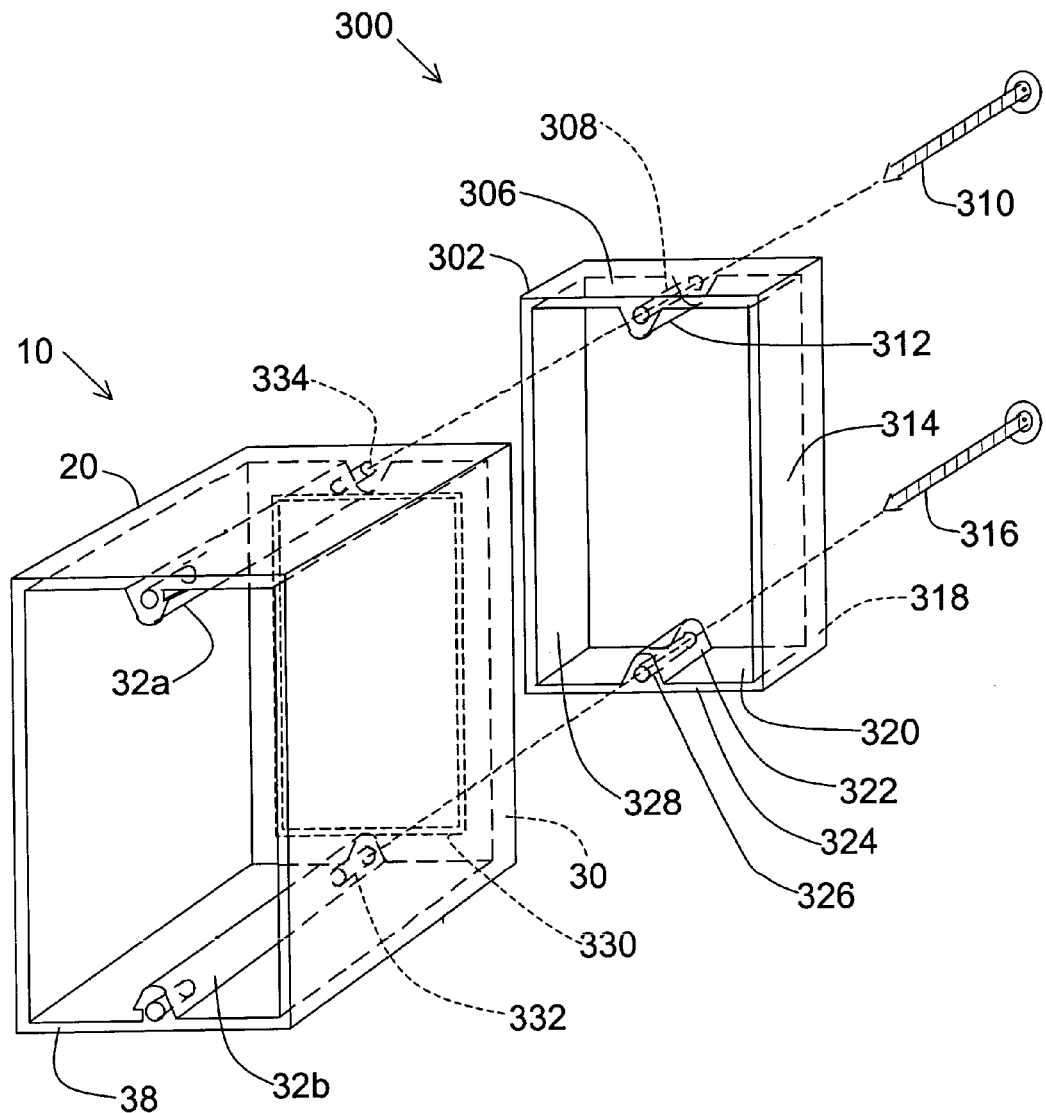
FIG. 10 is a front perspective view of the universal junction box in accordance with the rear extension embodiment of the invention.

FIG. 10 is illustrated in a front perspective view and shows the rear extension box feature (300) for providing a common junction box in a wall between two rooms by adding a rear extension box (300) to the universal junction box (10). The rear extension box (300) includes a generally rectangular body (302) having a top wall (306), a first side wall (314), a bottom wall (320), a second side (328) and an open front (324) and back (318). The rear extension junction box (300) may be made of metal or plastic. Preferably, the rear extension junction box (300) of FIG. 10 is formed from moldable plastic, such as polystyrene or the like, which makes the box easy to manufacture using standard injection molding techniques.

Each surface of the top and bottom walls (306, 320) of the rear extension box (300) includes fastening lugs (312, 322) with channels (308, 326) into which mounting screws (310, 316), respectively, are inserted through a device/face plate for terminating the circuit or covering the opening for future access. Channels (308, 326) are not threaded in order to allow the mounting screws (310, 316) to pass through the rear extension box (300) and enter channels (332, 334) within the fastening lugs (32a, 32b) of the universal junction box (10).

Channels (332, 334) of box (10) may be threaded or they may be manufactured in sizes such that insertion of a self-tapping screw will form threads in the channel. The mounting screws (310, 316) secure the device/face plate to the back surface (318) of the rear extension box (300) and mate the front surface (324) of the rear extension box (300) to the back portion (30) of universal junction box (10) to form an integral between-wall junction box. Although not shown in the drawing, the universal junction box (10) attachment features provide the methods for mounting to a structural member, as herein described. For a universal junction box (10), if the back (30) is closed, a knockout plate (330) would be included to allow cable installation into the rear extension box (300). Further, this same knockout plate (330) allows an open back design for the universal junction box (10) for low voltage cable applications.

Figure 11:
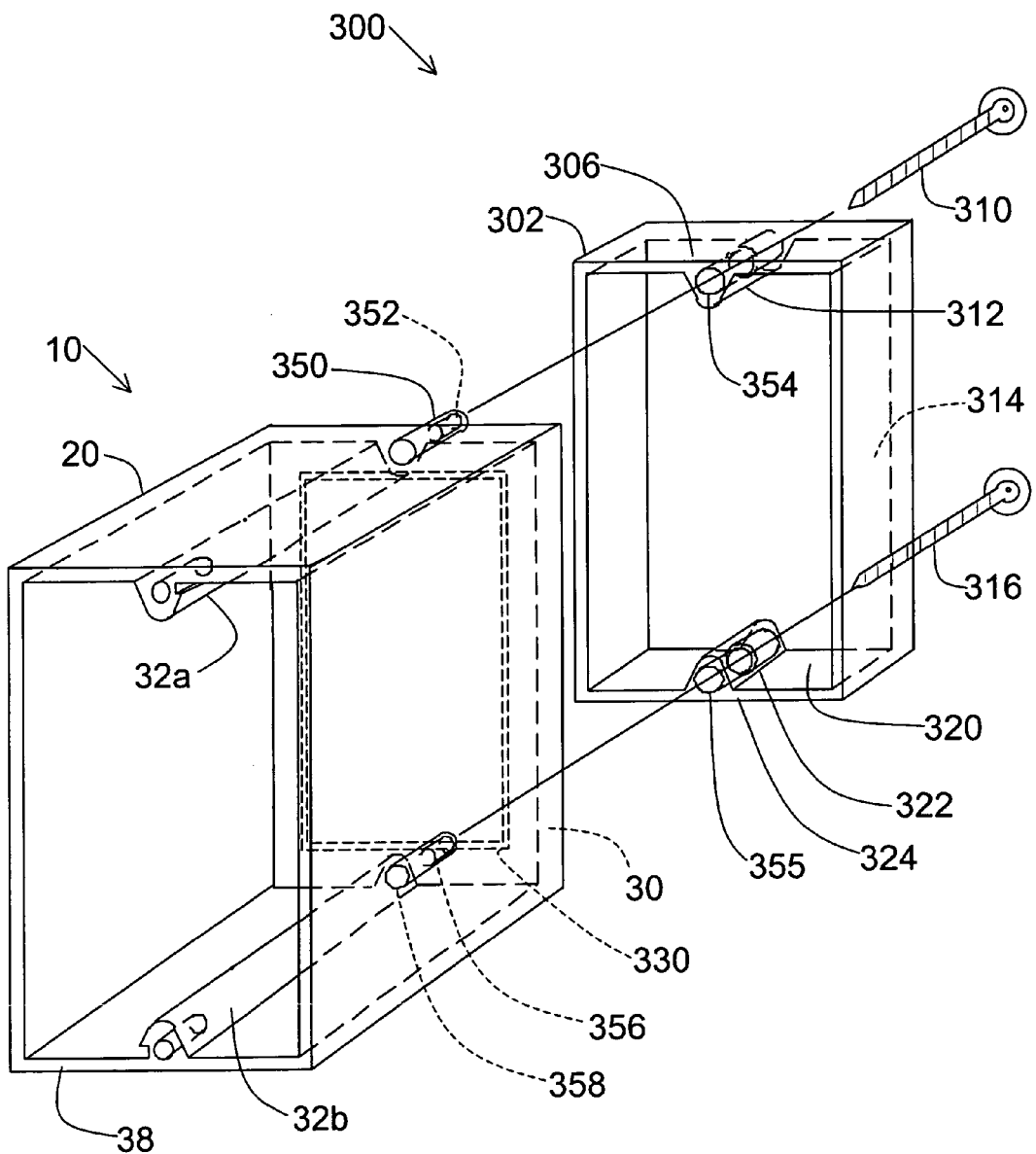
FIG. 11 is another embodiment of the rear extension embodiment shown in FIG. 10 of the invention.

FIG. 11 shows an alternative embodiment of the between-wall junction box feature. FIG. 11 is substantially similar to FIG. 10, except that the retaining mechanism to secure the rear extension box (300) to the universal junction (10) is different. Each surface of the top and bottom walls (306, 320) of the rear extension box (300) includes fastening lugs (312, 322) with channels (354, 355), respectively. Cylindrical mounting tabs (350, 358) extend from the back (30) of universal junction box (10). To secure the rear extension box (300) to the universal junction box (10), the cylindrical mounting tabs (350, 358) are inserted into channels (354, 355). In effect, the rear extension box (300) and the universal junction box (10) are aligned and keyed through use of the cylindrical mounting tabs (350, 358) and channels (354, 355).

This design allows the mating of the front surface (324) of the rear extension box (300) to the back portion (30) of universal junction box (10) to form the combined between-wall junction box without requiring mounting screws (310, 316) to temporarily hold the between-wall junction box together during wallboard installation. Mounting screws (310, 316) are later inserted through a device/face plate for terminating the circuit or covering the opening for future access. Channels (354, 355) are not threaded allowing the mounting screws (310, 316) to pass through and enter channels (352, 356) within cylindrical mounting tabs (350, 358), respectively, of the universal junction box (10). Channels (352, 356) are the same design as (332, 334), respectively, as described above in FIG. 10.

Figure 12:
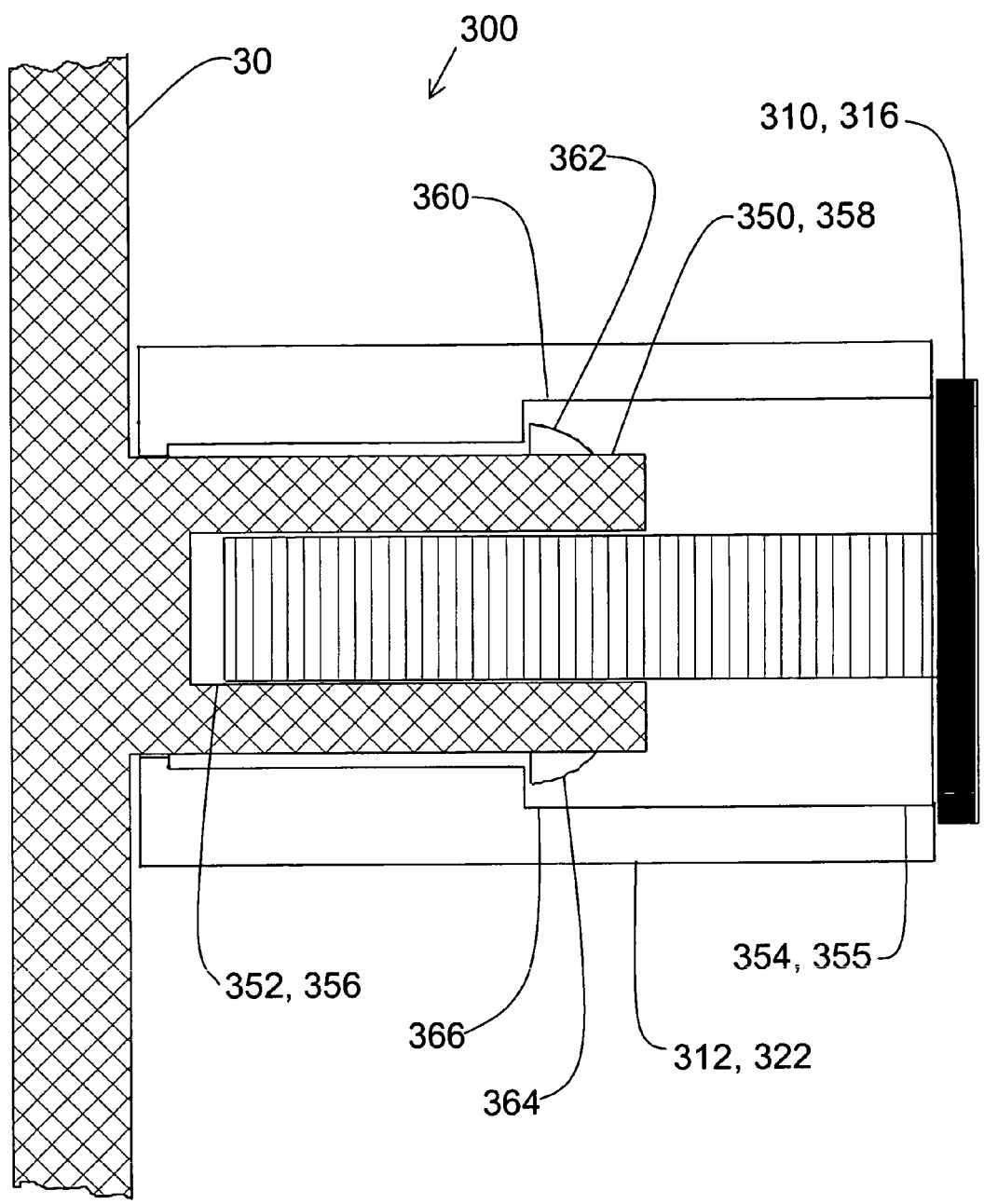
FIG. 12 is a cross-sectional view of the mounting tabs shown in FIG. 11.

FIG. 12 is illustrated in a cross-sectional view of cylindrical mounting tabs (350, 358) inserted into channels (354, 355) and as described in FIG. 11. Securing tabs (362, 364) snap into recesses (360, 366) to hold the rear extension box (300) in place.

This between-wall design provides a combined junction box composed of universal junction box (10) conjoined to rear extension box (300), that can be installed in a common wall between rooms allowing access to directly opposing wall surfaces through the same combined junction box thereby freeing wall space. Further, this integrated design approach provides a solution through the addition of a simple rear extension which takes advantage of the basic universal junction box unit already outfitted with facilities to attach the box or wires and lending further versatility to the universal junction box concept.

Side Extension Box

Figure 13:
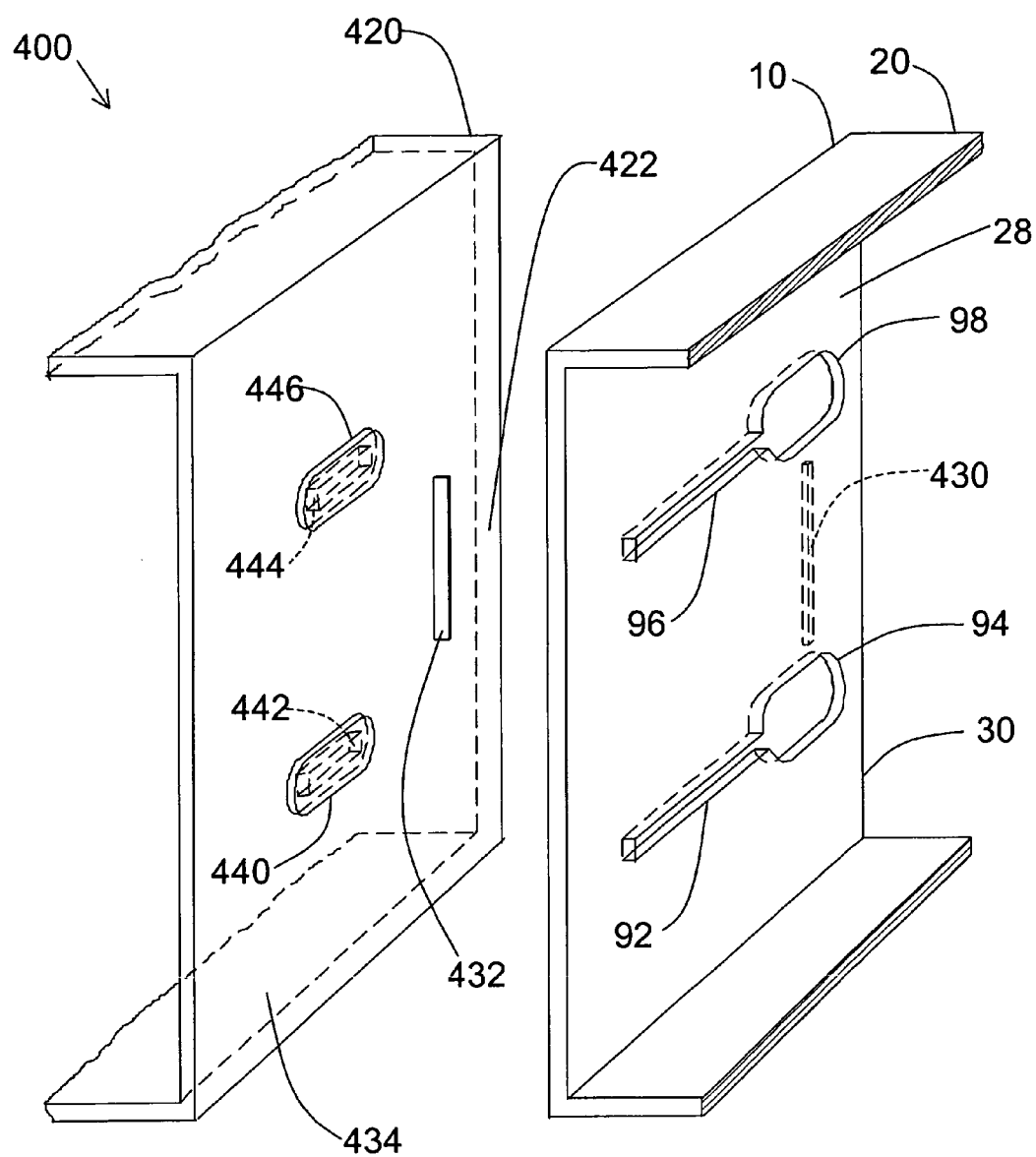
FIG. 13 is a partly cut away perspective view of the universal junction box and in accordance with the side extension box embodiment of the invention.

Traditionally, when more than a single space/one-gang junction box is required, multiple space gang boxes are used consistent with the number of spaces required. In FIG. 13, the side extension box feature (400) is illustrated in a partly cut away perspective view of the first side (434) area of the side extension box (420) along with a partly cut away perspective view of the second side (28) area of the universal junction box (10). This feature allows the single-space universal junction box (10) to be expanded by one or more spaces by adding one or more side extension box(s) to the universal junction box (10). The side extension box (400) includes a generally rectangular body (420) and is substantially similar to box (10). The side extension junction box (400) may be made of metal or plastic. Preferably, the side extension junction box (400) of FIG. 13 is formed from moldable plastic, such as polystyrene or the like, which makes the box easy to manufacture using standard injection molding techniques.

In FIG. 13, the features for mating the boxes (10, 420) are shown. The side extension box feature (400) attachment to the universal junction box (10) is facilitated through the use of the mounting aperture component (42) (see FIG. 2). In this example, the mounting aperture in the mounting aperture component (42) is shown within the second wall (28) also referred to as the sidewall (28) or inside wall (28), and consists of the previously described parallel channels (92, 96) which terminate at the bulbous apertures (94, 98), respectively, shown in FIG. 2. FIG. 3, the alternate embodiment of the mounting aperture component (100) could also be used.

In FIG. 13, the side extension box (420) includes fastening tabs (440, 446) which are attached to box (420) via standoff extensions (442, 444). The side extension box (420) is attached to the universal junction box (10) by inserting the fastening tabs (440, 446) into bulbous apertures (94, 98), respectively, until the sidewall of each box is mated. Once mated, the side extension box (420) can be pulled forward to engage standoff extensions (442, 444) within channels (92, 96) and fastening tabs (440, 446) with the inside wall (28) of universal junction box (10), respectively. To lock the side extension box (420) in place, requires tilting the rear (422) of box (420) away from universal junction box (10), and then pulling the side extension box (420) forward further so that locking tab (432) engages locking channel (430). The rear (422) of box (420) is then released to secure and lock the extension box (420) in place.

Figure 14:
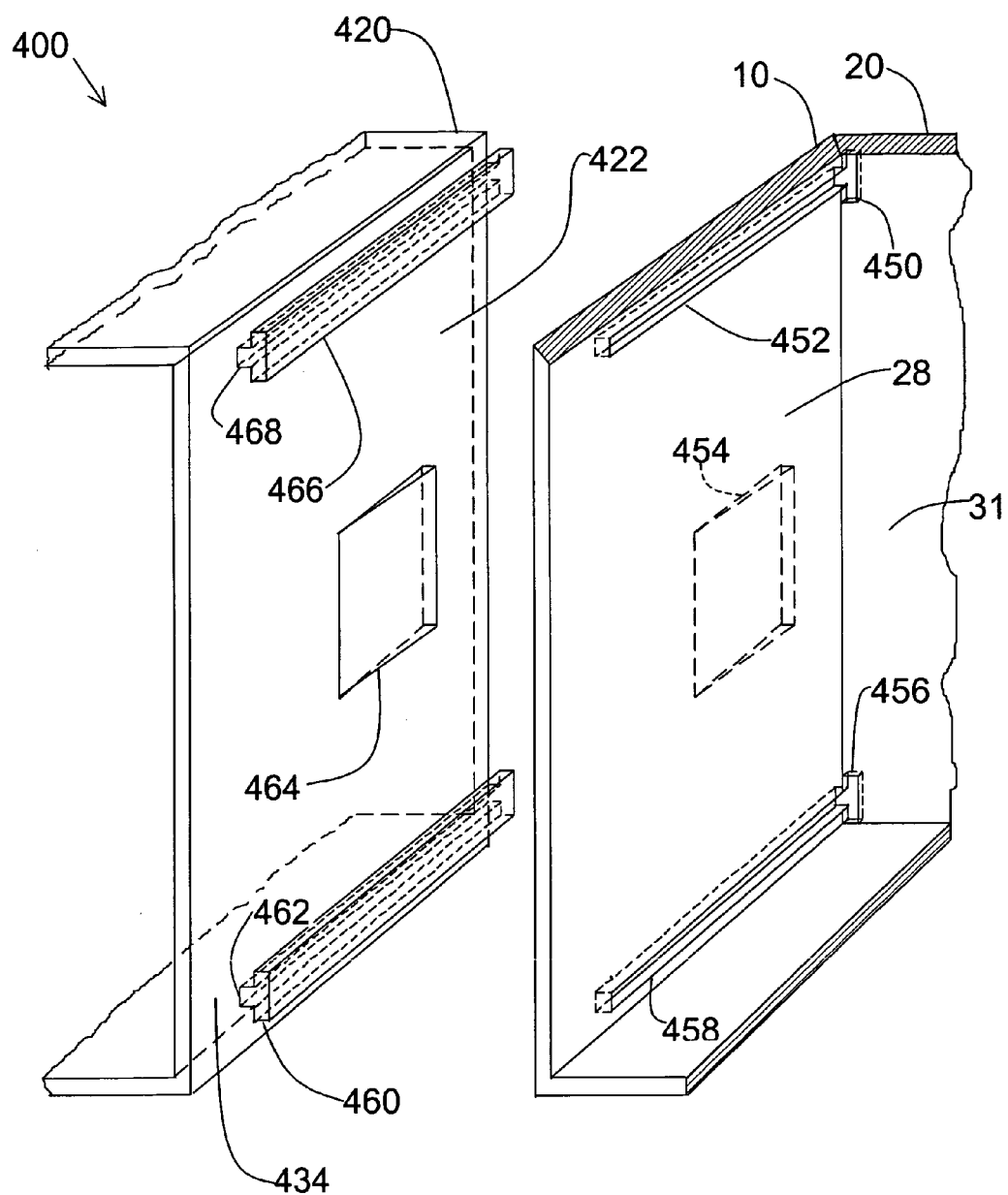
FIG. 14 is another embodiment of the side extension box embodiment shown in FIG. 13 of the invention.

FIG. 14 is an alternate embodiment of the side extension box feature (400) attachment to the universal junction box (10) in-lieu-of using the mounting aperture component (42) shown in FIG. 13. In FIG. 14, the side extension box feature (400) is illustrated in a partly cut away perspective view of the right side (434) area of the side extension box (420) along with a partly cut away perspective view of the side wall (28) area of the universal junction box (10). The side extension box (420) includes mounting tabs (460, 466) which are attached to box (420) via standoff extensions (462, 468). The side extension box (420) is attached to the universal junction box (10) by inserting the mounting tabs (466, 460) into openings (450, 456), in the rear or back portion (31) of box (10), respectively. Once mated, the side extension box (420) can be pulled forward to engage standoff extensions (468, 462) within channels (452, 458) and mounting tabs (466, 460), respectively, with the side wall (28) of universal junction box (10). The side extension box (420) can be locked in place with the locking tab (432) and locking slot (430) represented in FIG. 13 or the alternate locking embodiment represented in FIG. 14.

The alternate locking embodiment represented in FIG. 14 includes a matching ramp (464) on box (420) and ramp cavity (454) within sidewall (28) of box (10). This configuration automatically tilts the rear (422) of box (420) away from universal junction box (10) as the extension box (420) is pulled forward and then engages as the matching ramps meet to lock both boxes securely in place.

In FIGS. 13 and 14, both sidewalls (28, 434) are represented as flat surfaces. As an alternate to the flat sidewalls (28, 434), one wall could be partially protruded with the other wall recessed. Another alternate would be to swap the mounting and securing features between the boxes or attach either the mounting or securing features directly to a structural member and use the other feature to attach a box to the same structural member. Although it is not depicted in the FIGS. 13 and 14, it should be understood that view 400 only illustrates the first side (434) area of side extension box (420). The unillustrated second side area of side extension box (420) would exactly mirror the second side (28) area of box (10), as shown in FIGS. 13 and 14. This design allows multiple side extension boxes to be joined together side-by-side to effect a multiple gang box arrangement. In a similar manner, the unillustrated back side area of the side extension box (420) would mirror the back side (30) of the universal junction box shown in FIGS. 10 and 11 so that a rear extension box (300) can be mounted and joined to a side extension box (420). For UL certification purposes or to retain structural integrity, the embodiments within sidewall (28) of box (10) could be enclosed inside box (10).

This integrated design provides a solution for multiple gang junction box applications through the addition of a simple side extension box which takes advantage of the basic universal junction box unit already outfitted with facilities to attach the box or wires, thus lending further versatility to the universal junction box concept.

Low Voltage Features

In order to prevent loss of bandwidth capacity, kinking or excessive bending of cables should be avoided. When installing low voltage circuits, the current practice is for installers to cut the back off a standard high voltage electrical junction box. The new opening allows the necessary bending radii for the low voltage cables and, also, allows the mounting of low voltage apparatus, which often fills all of the space inside the junction box. The edges of standard electrical junction boxes can damage fragile cables when they are pulled through the openings. Installers usually do not have enough room inside standard junction boxes to coil multiple cables during the wall installation phase of construction. The aforementioned installation approach does not provide protection or a neat method for holding the cables in place. Consequently, the cables stored in such a cramped, unorganized fashion are subject to damage after they are installed prior to completion of the construction phase. Further, the current practice does not provide a convenient way to secure an extra long service loop, which would allow easy connection of very small, intricate terminating devices.

Figure 15:
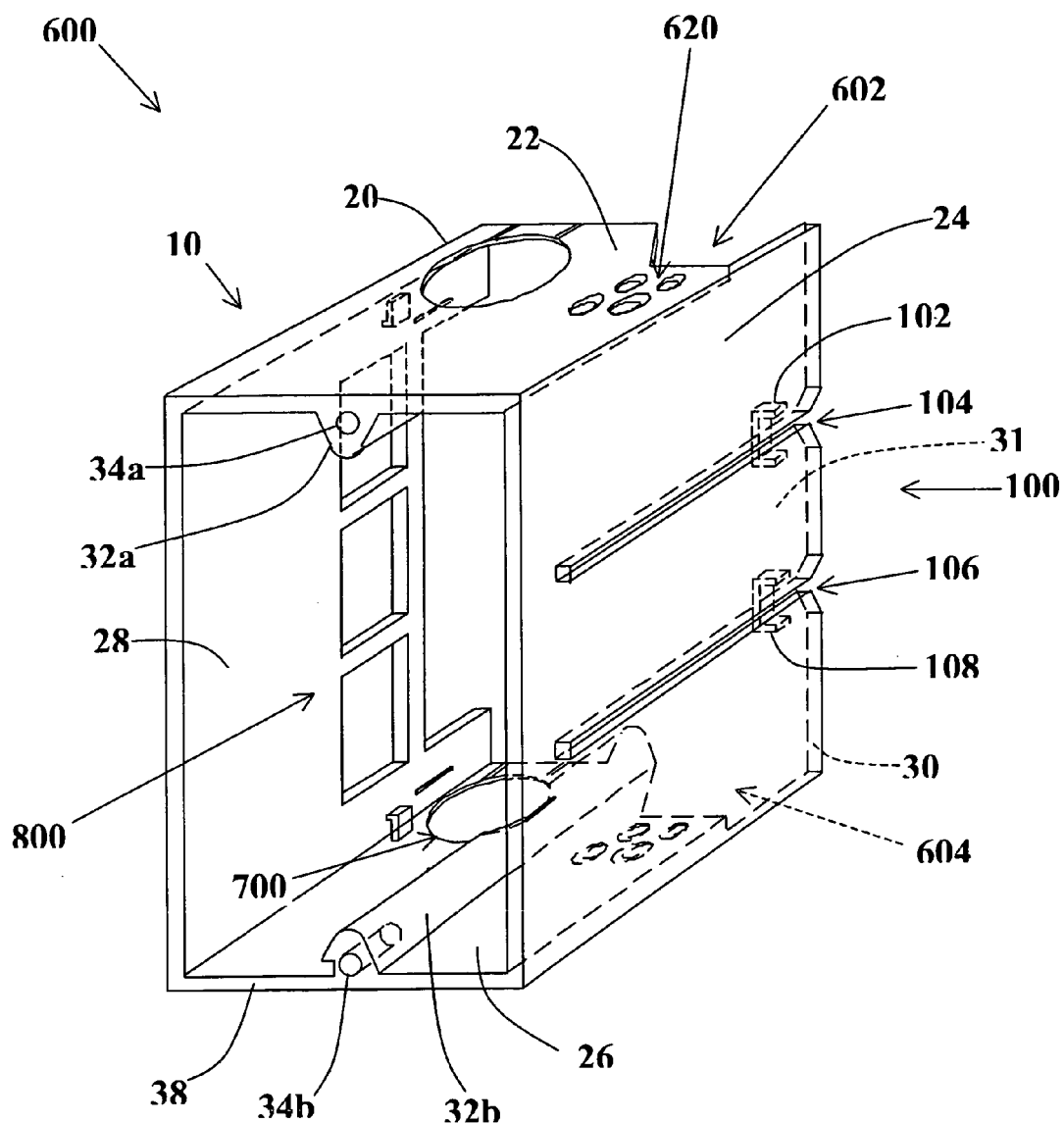
FIG. 15 is a front perspective view of the universal junction box in accordance with the second group of invention embodiments for securing low voltage wire, cable and conduit within the universal junction box.
Figure 16A:
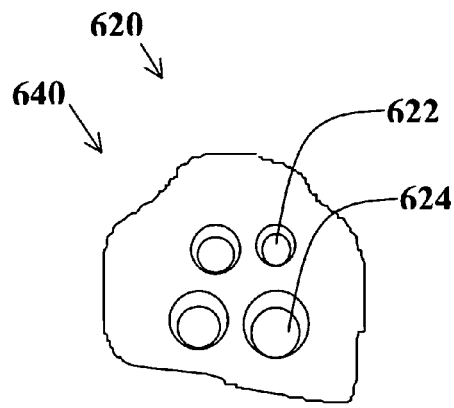
FIGS. 16a–d are a cross-sectional view in accordance with the slanted cable attachment embodiment of the invention shown in FIG. 15.
Figure 16B:
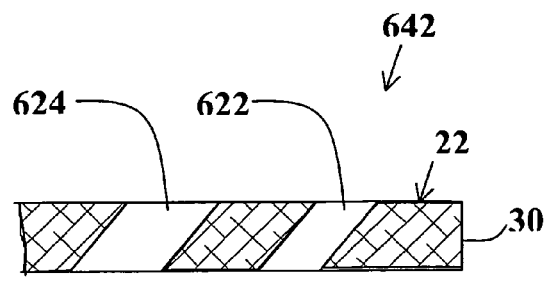
Figure 16C:
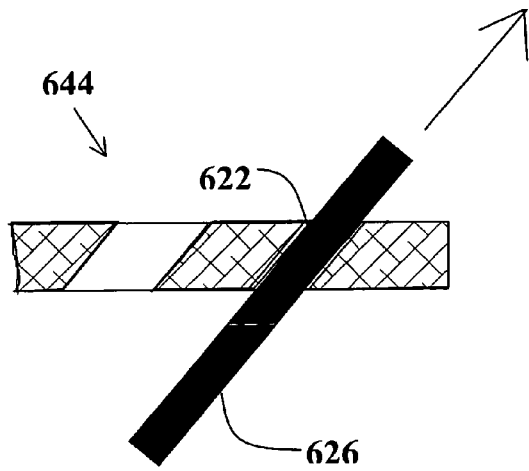
Figure 16D:
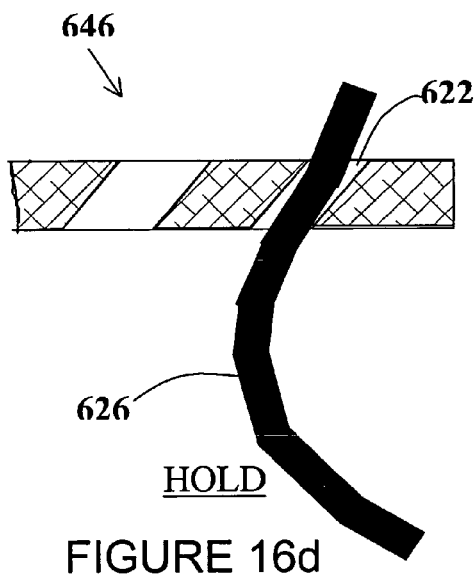
Figure 17A:
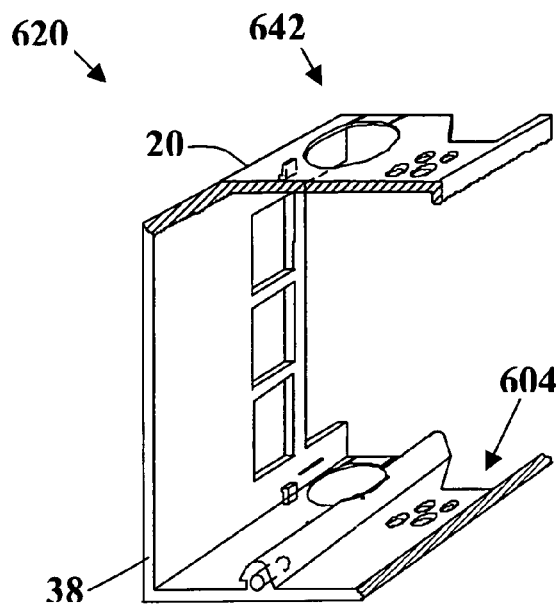
Figure 17C:
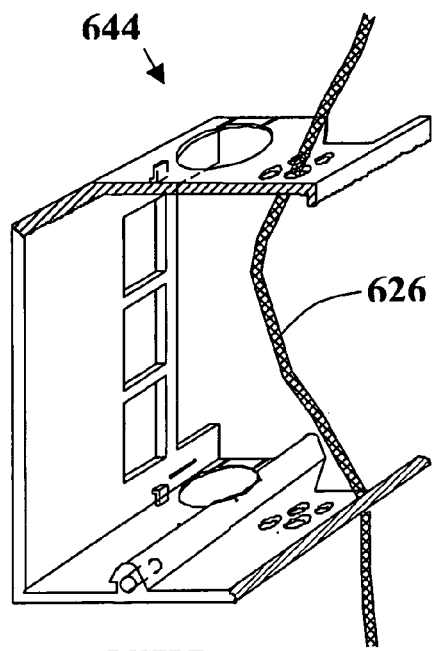
Figure 17C:
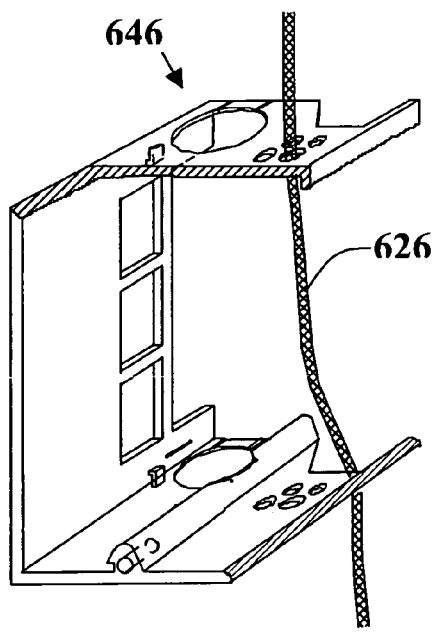
Figure 17D:
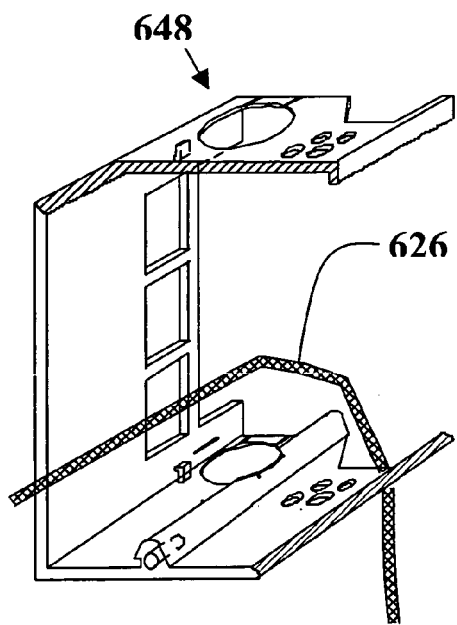

FIG. 15 is illustrated in a front perspective view and shows the universal junction box (10) low voltage attachment features (600) for securing wire, cable and conduit within the box (10). Low voltage cables can include an individual wire, fiber optic, coaxial, twisted pair, and category 5E cables. For low voltage application, the back (30) of the box (10) is open. Each surface of the top and bottom (22, 26) of the box (10) includes fastening lugs (32a, 32b) with cavities (34a, 34b) into which mounting screws are inserted through a device or faceplate for terminating the circuit.

In FIG. 15, the low voltage features (600) for securing wire, cable and conduit within the universal junction box (10) are shown and include: the slanted cable attachment (620), the flexible conduit attachment (700), the cable-tie attachment, cable-holding apertures, and the excess-cable apertures (800). FIG. 15, also shows the mounting aperture component (100) previously shown in FIG. 3.

Slanted Cable Attachment

FIG. 15 shows the slanted cable attachment feature (620) for securing wires and cables within the box (10). Slanted cable attachment feature (620) would be located in the top and bottom (22, 26) of box (10) and includes several slanted oblique cavities for different cable sizes.

FIG. 16 illustrates several detailed cross-sectional views of the slanted cable attachment feature (620). Top view (640) includes several slanted oblique cavities for different cable sizes. Cross-sectional view (642) shows the slanted oblique cavities (622, 624) with no cable installed. The slanted oblique cavities (622, 624) result in smaller openings through the vertical plane. This feature allows a cable to grasp and not slip through the oblique cavity after the cable is inserted into the cavity and released. This feature prevents damage to fragile cables. In view (644), the cable (626) is inserted through oblique cavity (622).

To insert the cable (626) the installer would pull it through the back (30) of the box (10) and insert it into the oblique cavity (622) at an angle that avoids stress on the cable or the need to coil the cable within the box. The next step would be to pull sufficient length of cable through oblique cavity (622) for a service loop for connection to a terminating device. To hold the cable in place during the wallboard installation phase, cable (626) would be moved back towards the vertical plane as shown in view (646). When it is time to install the terminating devices, the installer would simply pull the cable (626) forward through the front (38) of the box (10). Because the oblique cavity is slanted toward the front (38) of the box (10), the cable disengages easily from the cavity and automatically allows sufficient bending radius needed for fragile cables used in low voltage applications.

FIG. 17 is illustrated in a front perspective cross-sectional view and shows the slanted cable attachment feature shown in FIG. 15 and represents the four stages (642, 644, 646, 648) of installing a cable. The first installation step is presented in view (642) of the box (10) without any cable. The second installation step is presented in view (644) with cable (626) shown in the insert position. The third installation step is presented in view (646) with cable (626) shown in the hold position. The last installation step is presented in view (648) with cable (626) removed from the oblique cavity and ready for termination. A long service loop is facilitated by use of the wall cavity itself to store and protect the extra cable needed during the wallboard installation stage. When it is time to install the terminating devices, the installer would simply pull the cable (626) forward through the front (38) of the box (10). This self-retention method of securing the cable (626) allows it to be disengaged easily from its holding position and automatically allows sufficient bending radius needed for fragile cables used in low voltage applications.

The advantages of the slanted cable attachment feature include: an easy method to secure the cable during the wallboard installation phase of construction; protection of cables within the wall cavity and box from damage during the wallboard installation phase; and provision of extra long service loops because the longer cable can be stored in the wall cavity.

Flexible Conduit Attachment

Conduit systems are often installed to accommodate easy removal or addition of cables after completion of building construction. The use of flexible conduit is commonly used in high and low voltage circuit applications to achieve this end. Flex conduit, which is readily available in the marketplace, contains radial grooves along the surface of the conduit to allow the conduit and the cables carried within it to bend easily. The current method for installation of a flexible conduit to a junction box requires first adding a threaded bushing to the conduit, then inserting the bushing through a properly sized hole, and finally securing the bushing with a nut to anchor the conduit to the junction box. This method requires multiple pieces of hardware and is time-consuming to install. Further, this method precludes the use of flexible conduit when attaching a junction box to a wallboard surface because the flexible conduit fittings extending from the box do not fit through the opening in the wallboard to mount the junction box.

Figure 18A:
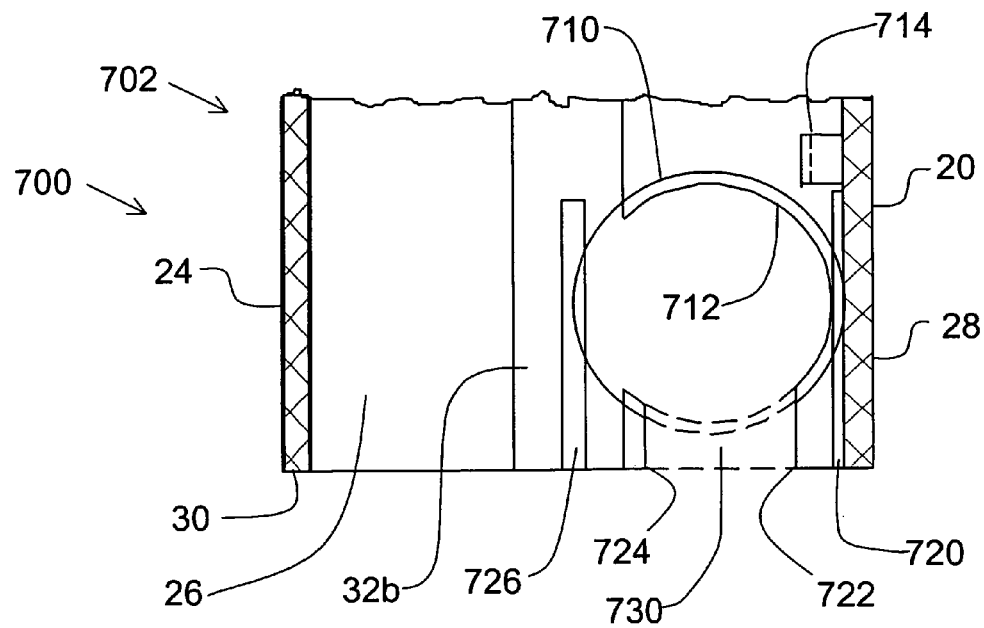
FIGS. 18a–b are a cross-sectional top and back side elevation in accordance with the conduit attachment embodiment of the invention shown in FIG. 15.
Figure 18B:
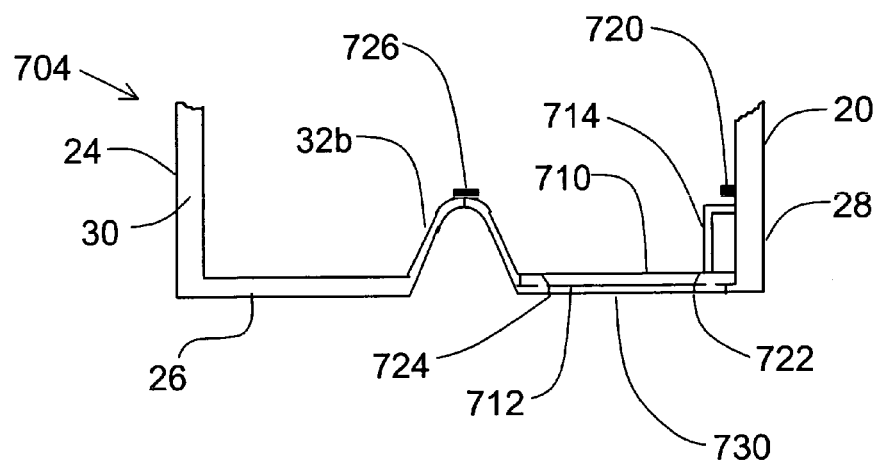
Figure 19:
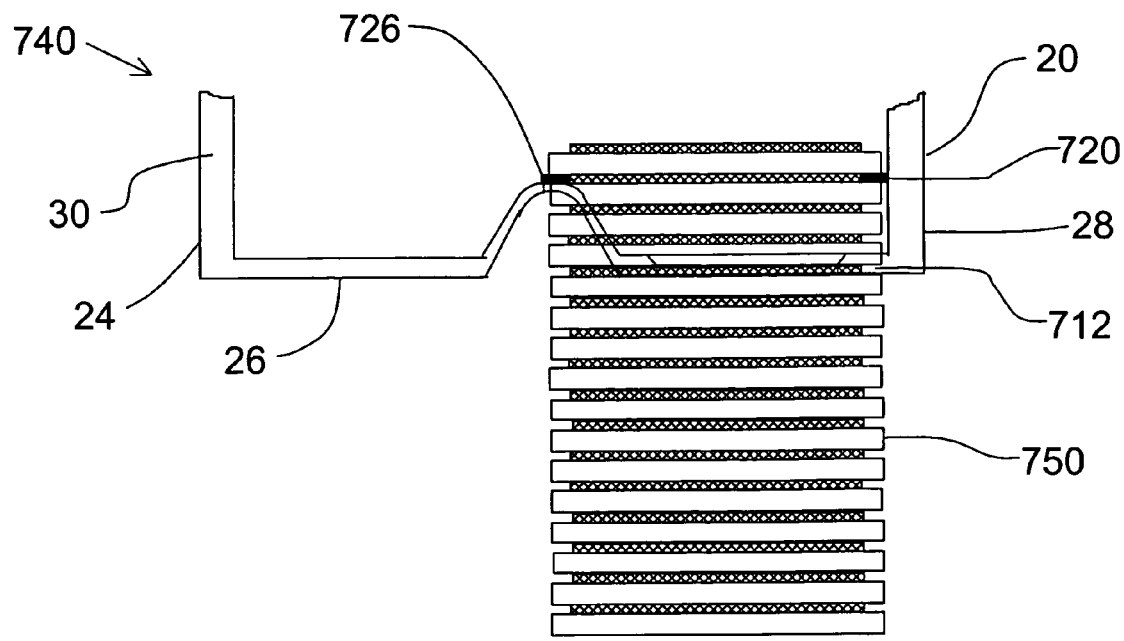
FIG. 19 is another cross-sectional top and back side elevation in accordance with the conduit attachment embodiment of the invention shown in FIG. 15.

FIG. 18 shows the details of the flexible conduit attachment (700) and is illustrated as a cross-sectional top elevation view (702) of the bottom (26) of box (10) and rear elevation view (704) of the back (30) of the box (10). The flexible conduit attachment (700) would be included in the top and bottom (22, 26) of the box (10). The circular aperture (710) includes a recessed edge (712) and, as an example, would be sized for standard ¾ inch flexible conduit. The retaining bar (726) is molded to longitudinal lug (32) and is across the outer edge of the circular aperture (710). The retaining bar (720) is molded to the inside of the first side (24) of box (10) and is directly across from the retaining bar (726) at the same elevation. The recessed edge (712) and the retaining bars (720, 726) are the depth and size of the flexible conduit's radial grooves. Grooves (722, 724) mark the area to be removed with electrical diagonal pliers or with a utility knife to provide the opening (730) shown in FIG. 19. FIG. 19a shows the removal of the area between grooves (722, 724) to provide opening (730) and is illustrated as the cross-sectional top elevation view (702) of the bottom (26) of box (10) and rear elevation view (704) of the back (30) of box (10).

Figure 20:
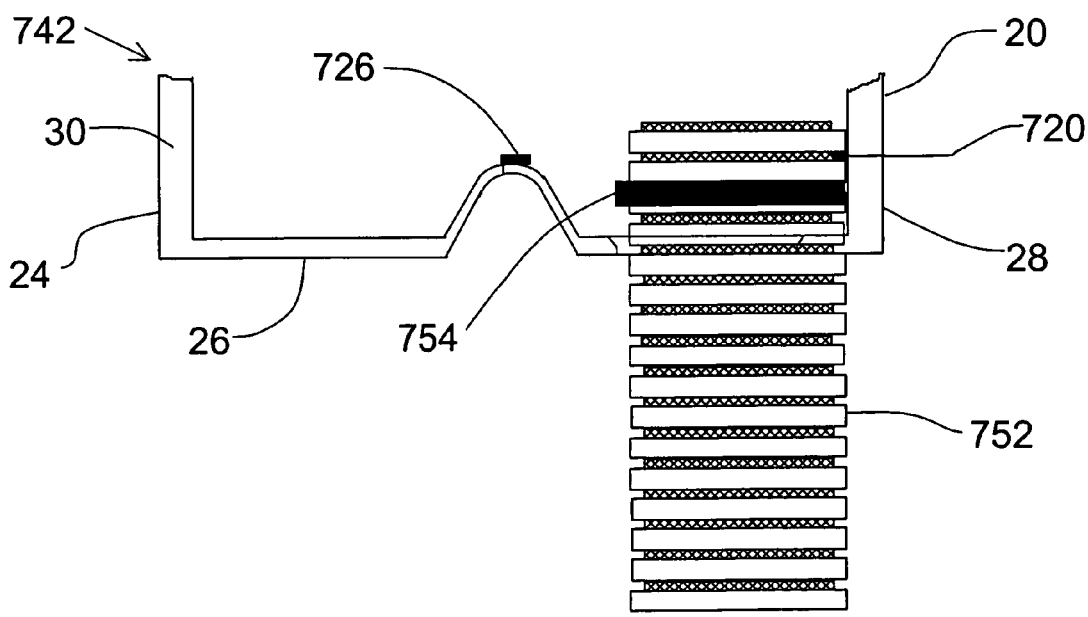
FIG. 20 is a back side elevation of the flexible conduit attachment and conduit shown in FIG. 19.

FIG. 20 is a rear elevation view of FIG. 19 and shows the flexible conduit installed. The first view (740) is with a ¾ inch flexible conduit installed. The second view (742) is with a smaller ½ inch flexible conduit installed.

To install the ¾ inch flexible conduit (750) shown in view (740), the area between grooves (722, 724) shown in FIG. 18 would be removed to provide opening (730) shown in FIG. 19. Next, the neck of the flexible conduit (750) would be pushed through the opening (730) to engage the retaining bars (720, 726) and recessed edge (712) allowing the plastic surrounding the opening (730) to return to its original position and clamp the conduit securely in place. This snap-in and clamp design is allowed by the inherent ability of plastic to move momentarily and return to its original position while retaining the flexible conduit in place with the retaining bars (720, 726) and recessed edge (712).

As an alternate, the area between grooves (722, 724) would not be removed. The conduit would simply be pushed through circular aperture (710) from the bottom (26) of the box (10) with rocking motion until the radial grooves of the flexible conduit (750) engage the retaining bars (720, 726) and recessed edge (712). This push-through installation alternate is facilitated by the flexibility and deformation characteristics of the plastic used for the box (10) and the flexible conduit (750). While this alternate design is described for a low voltage application, this same alternate could also be used in a high voltage application because the void produced by the opening (730) would be closed when the flex conduit is installed and, hence, would be acceptable for UL certification.

To install the ½ inch flexible conduit (752) shown in the second view (742), the flexible conduit (752) would be placed through opening (730) to engage the retaining bar (720) and recessed edge (712). Next, a standard cable tie (754) would be inserted through the bridge bracket (714) and then around the ½ inch flexible conduit (752) and tightened. As an alternate to the flexible conduit attachment feature (700) discussed above, bridge brackets (102, 108) could also be used to attach a flexible conduit through open apertures (602, 604) respectively, shown in FIG. 15.

The snap-in design is simple requiring no extra pieces of hardware and is quick to install. Also, this design allows a flexible conduit to be installed when attaching a junction box directly to a wallboard surface. The flexible conduit is not precluded from use because no bushings extend below the box, as in the current art, allowing the junction box to be inserted into the wallboard surface opening with no protrusions.

Low Voltage Features

In FIG. 15, the low voltage features (800) for securing wire and cable within the universal junction box (10) are shown and include: the cable-tie attachment (810), cable-holding apertures (850), and the excess-cable aperture (870).

Cable-Tie Attachment

Figure 21:
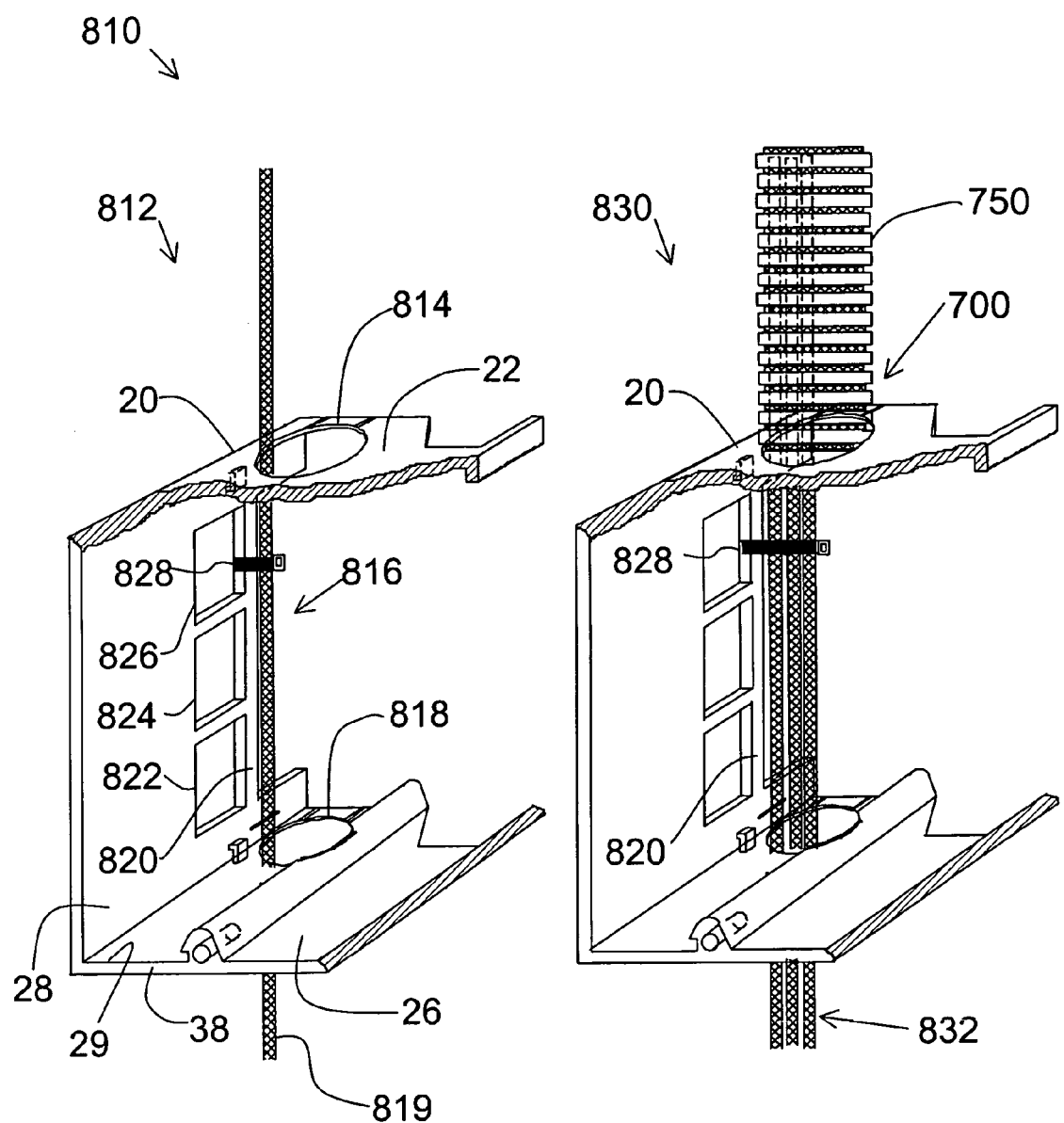
FIG. 21 is a cross-sectional front perspective view of the universal junction box in accordance with the cable wrap attachment embodiment of the invention shown in FIG. 15.

FIG. 21 illustrates two separate, identical detailed cross-sectional front perspective views of the cable-tie attachment (810) feature for securing wires and cables within box (10). A single cable installation is shown in view (812). A multiple cable installation is shown in view (830). Cable-tie attachment (810) feature is shown within sidewall (28) of box (10) and consists of a pillar (820) formed by adjacent openings (816, 822, 824, 826), which facilitates an easy installation of the cable-tie (828) within box (10). The cable(s) (819, 832) enter and exit the box (10) through apertures (814, 818). The cable(s) (819, 832) are secured within the box (10), during the wall board installation stage, by installing a cable-tie (828) around pillar (820) and the cable(s) (819, 832). A long service loop is facilitated by use of the wall cavity to store and protect the extra cable needed during the wall board installation stage. When it is time to install the terminating devices, the installer would cut away the cable-tie (828) and pull the cable(s) (819, 832) forward through the front (38) of the box (10). This method of temporarily securing the cable(s) (819, 832) allows them to disengage easily and automatically allows sufficient bending radius needed for fragile cables used in low voltage applications.

In this example, the apertures (814, 818) are the same apertures used in the flex conduit attachment (700). In view (830), as an enhancement, a short piece of flexible conduit (750) is shown added through the use of the flex conduit attachment (700) to provide additional protection of fragile cables within the wall cavity, during the wall board installation stage.

The previous discussion only presents one example of the cable-tie attachment (810). Another example would be to use the back (30) of box (10) and adjacent opening to form pillar (820) in-lieu-of openings on both sides of pillar (820). If apertures (814, 818) and pillar (820) are not available, an alternate embodiment would allow attachment of cables within box (10) by means of cable ties. This embodiment would entail the insertion of cable-ties through bridge braces (102, 108) to secure cables entering and exiting the box (10) through openings (602, 604) shown in FIG. 15.

Cable-holding Apertures

Figure 22:
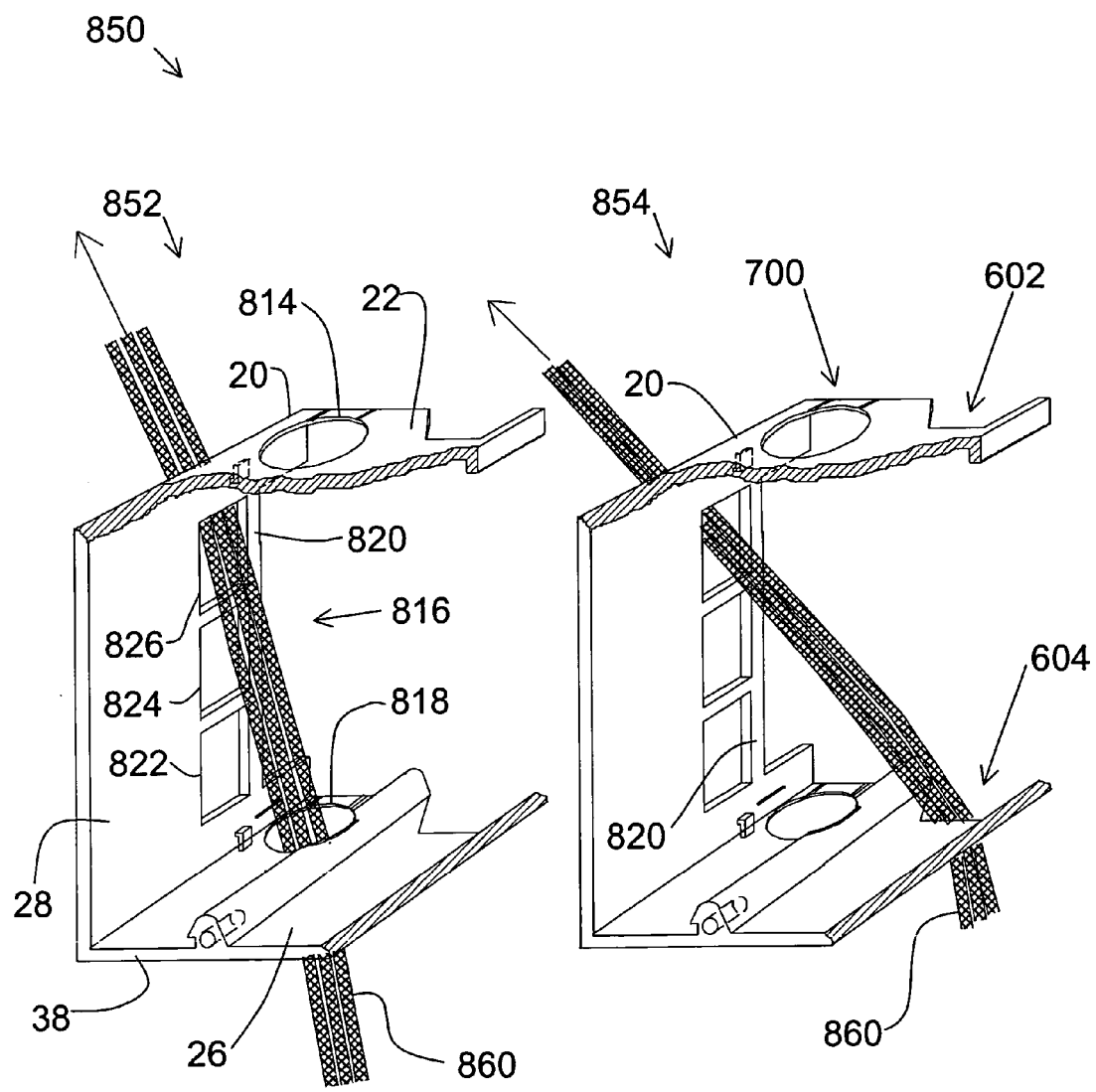
FIG. 22 is a cross-sectional front perspective view of the universal junction box in accordance with the cable holding apertures embodiment of the invention shown in FIG. 15.

FIG. 22 illustrates two separate, identical detailed cross-sectional front perspective views of the cable-holding apertures (850) feature for securing multiple wires and cables within box (10). An installation of cables (860) through aperture (818) is shown in view (852) with an alternate installation through opening (604) shown in view (854). The cable-holding aperture (850) feature is shown within sidewall (28) of box (10) and consists of a ladder design formed by openings (822, 824, 826). This ladder design is based on the same concept as the slanted cable attachment (620) as shown in FIG. 15, but applied on a larger scale for multiple cables. Cables (860) can enter the box (10) through openings (602, 604, 814, 818) and exit through one of the three openings (822, 824, 826) arranged in a columnar configuration, that form the ladder. The slant of these cables through the opening causes them to grasp and not slip through the aperture when the cables are inserted and released.

This design secures the cables within the box during the wallboard installation stage. The multiple openings (822, 824, 826) that form the columnar ladder offer different angles of cable insertion, thus providing varying degrees of cable self-grasping action against the rungs of the ladder. The installer selects the most suitable opening based on the resistance desired for the type and quantity of cables used.

A long service loop is facilitated by use of the wall cavity to store and protect the extra cable needed during the wallboard installation stage. When it is time to install the terminating devices, the installer would simply pull the cables (860) forward through the front (38) of the box (10). This method of securing the cables (860) allows them to disengage easily and automatically allows sufficient bending radius needed for fragile cables used in low voltage applications.

Excess-Cable Aperture

Figure 23:
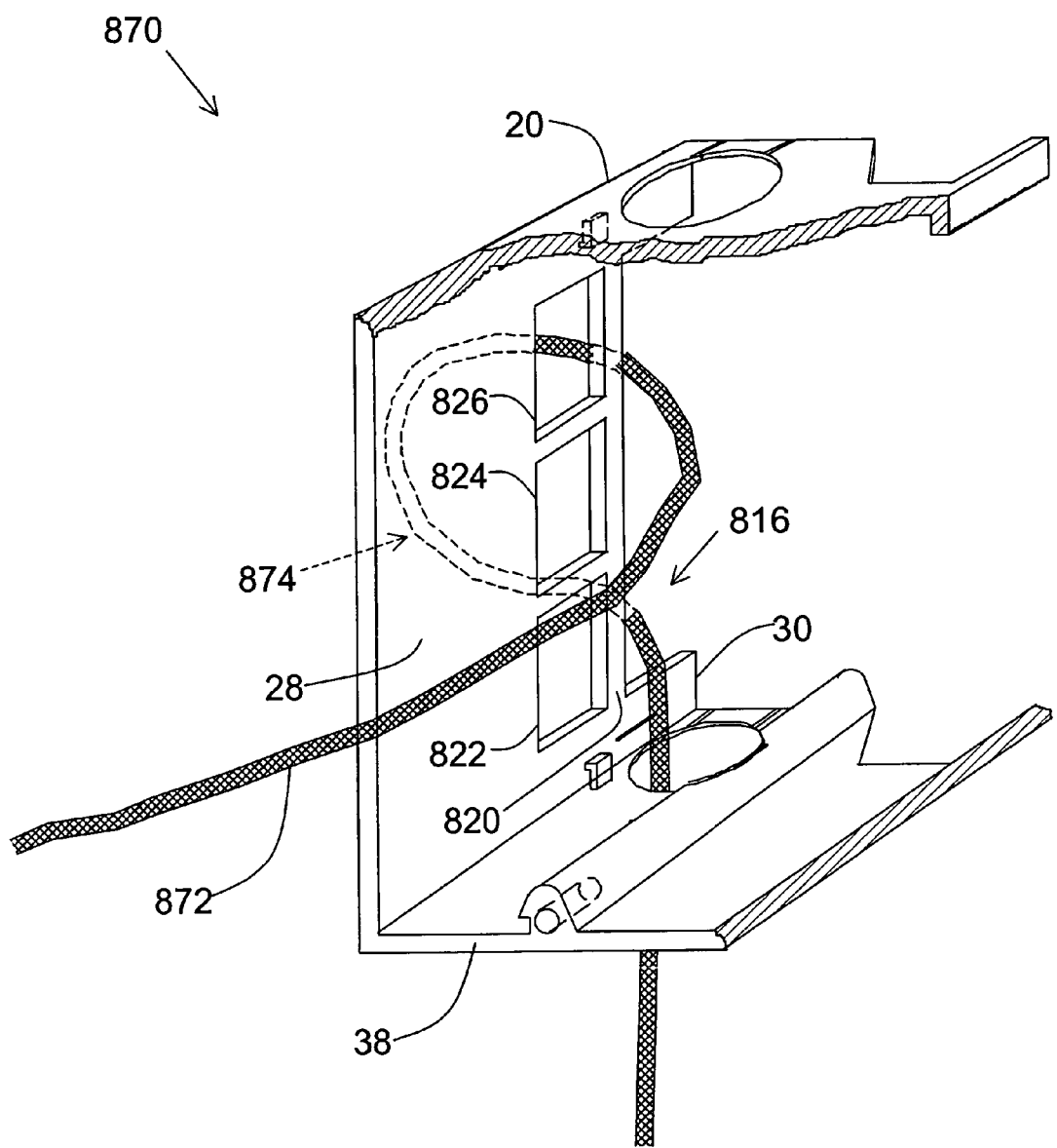
FIG. 23 is a cross-sectional front perspective view of the universal junction box in accordance with the excess-cable aperture embodiment of the invention shown in FIG. 15.

FIG. 23 illustrates a detailed cross-sectional front perspective view of the excess-cable aperture (870) feature. Excess-cable aperture (870) feature is shown within sidewall (28) of box (10) and consists of an opening (816) adjacent to the ladder design formed by openings (822, 824, 826). This feature facilitates storage of cable (872) in the wall cavity (874) to the side of the box (10) after a device is terminated and mounted to the front (38) of box (10). As an additional note, this feature also allows a method for: storage of the service loop when the rear extension box (300) feature is used, storage of the service loop when a mounting device entirely fills interior of the junction box; and storage of fragile cables used in low voltage applications with sufficient bending radius to prevent the cables from kinking.

The advantages of the low voltage features presented herein include: an easy method to secure the cable(s) during the wallboard installation phase of construction; protection of cable(s) within the wall cavity and box from damage during the wallboard installation phase; ability to use extra long service loops facilitating the termination of very small terminating devices; and protection of fragile low voltage cables by providing sufficient bending radius needed to prevent the cable(s) from kinking.

High Voltage Features

High voltage cables commonly used for 120-volt outlet and lighting circuits range from two #14 conductors with a ground wire to three #12 conductors with a ground wire. As a result, the cable diameter between the two extremes can vary by as much as three times in size. High voltage junction boxes are used to connect the circuits and mount electrical terminating devices such as outlets, switches and lighting fixtures. To facilitate these circuits, multiple openings for the cables to enter the box are required and because of limited space within the box, each opening is sized to accommodate both cable size extremes.

Methods for securing these cables within the junction box are determined by the National Electric Code (NEC). The NEC requires high voltage cables to be anchored no greater than four inches from junction boxes without cable-securing device and 8 inches when a cable-securing device is provided. In applying these codes, multiple gang and wallboard mounted junction boxes would normally require a cable-securing device because a place to anchor the cable will be more than 4 inches away, whereas a single junction box mounted to a framing structure is within four inches. UL certification testing for the securing device is also required. The UL test for the securing device requires the cable entering the bottom of the box to be subjected to a direct vertical pull of 25 pounds for 5 minutes in a conditioned environment of minus 20 degrees centigrade without damage to the cable sheath or conductors and a displacement of the cable of more than ⅛ inch.

High voltage cables tend to be robust because of the cable sheaths and wire insulation used but can be subjected to damage when entering the junction box if not carefully installed. The current art available either provides no anchoring devices with openings sized for the largest cables or clamping designs that provide insufficient clamping of smaller cables or too much clamping for the larger cables. Too much clamping commonly can damage the cable if not properly installed and makes pulling any size cable into the box difficult. As a result of the above, there is a need for a high voltage junction box with a high voltage cable-securing device which eases installation and provides sufficient anchoring of all sizes of cables while not causing damage to them.

Figure 24:
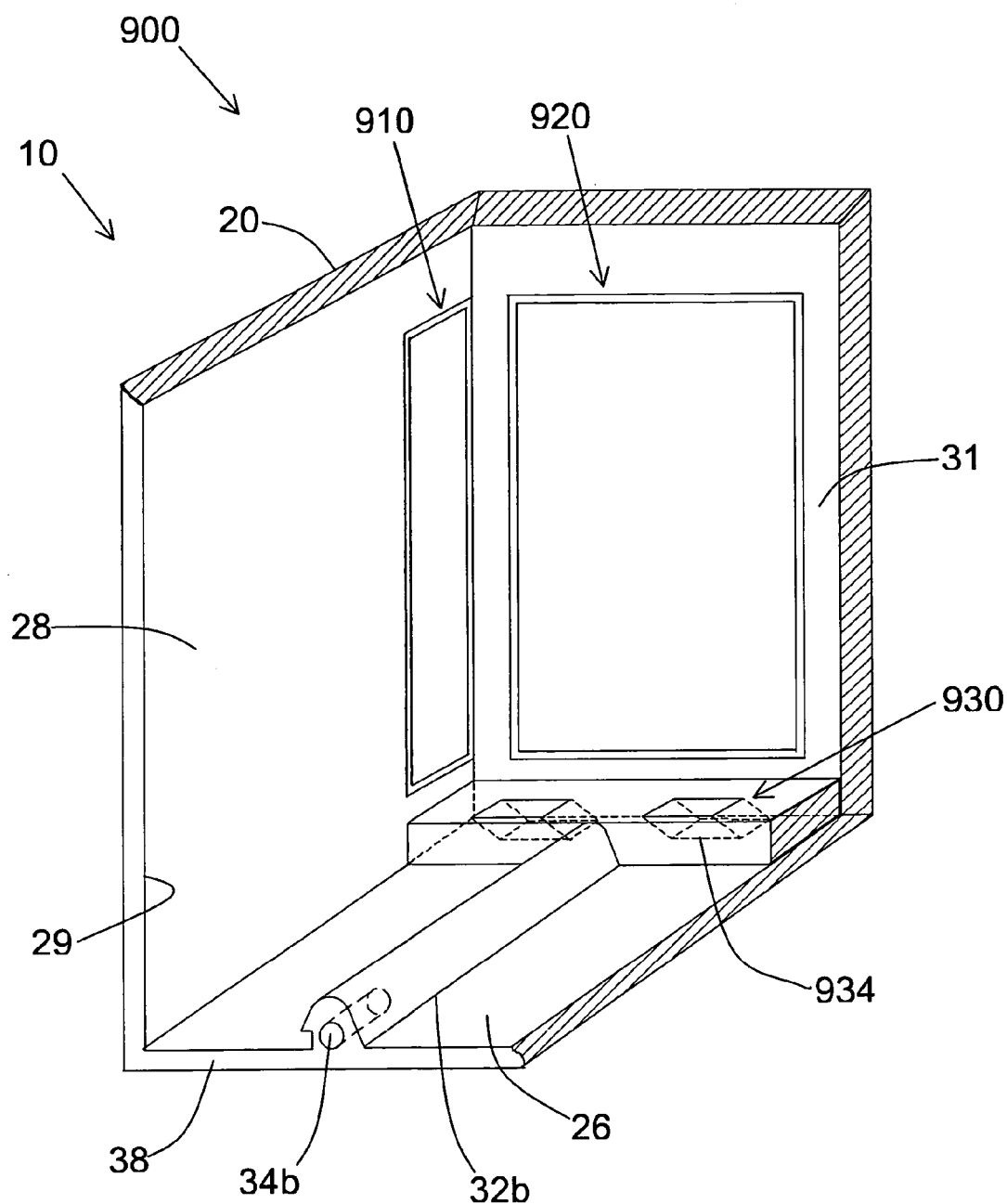
FIG. 24 is a front perspective view of the universal junction box in accordance with the third group of invention embodiments for access and securing high voltage wire and cables within the universal junction box.

FIG. 24 is illustrated in a cross sectional front perspective view and shows the universal junction box (10) high voltage features (900) for access into box (10) and includes the removable side extension access panel (910), removable rear extension access panel (920), and cable-securing feature (930).

In FIG. 24, the removable side extension access panel (910) is located within sidewall (28) of box (10). The side extension access panel (910) allows access to box (10) from a side extension box (420), as shown in FIGS. 13 and 14, when used. This side extension access panel (910) would only be used when the side extension houses another high voltage circuit. In the case of a low voltage side extension, the side extension panel would not be used because UL prohibits sharing low and high voltage circuits and requires a solid partition between the two. This configuration is only shown as an example and would be configured to match an equivalent removable access panel in the side extension box (420).

In FIG. 24, the removable rear extension access panel (920) is located within the back portion (31) of box (10). The rear extension access panel (920) allows access to box (10) from a rear extension box (300), as shown in FIGS. 10 and 11, when used. In FIG. 24, cable-securing feature (930) is located within the bottom (26) of box (10) and includes one or more oblique channels (934). While not shown in this view, the oblique cavity (934) would also be located in the top (22) of box (10).

Figure 25:
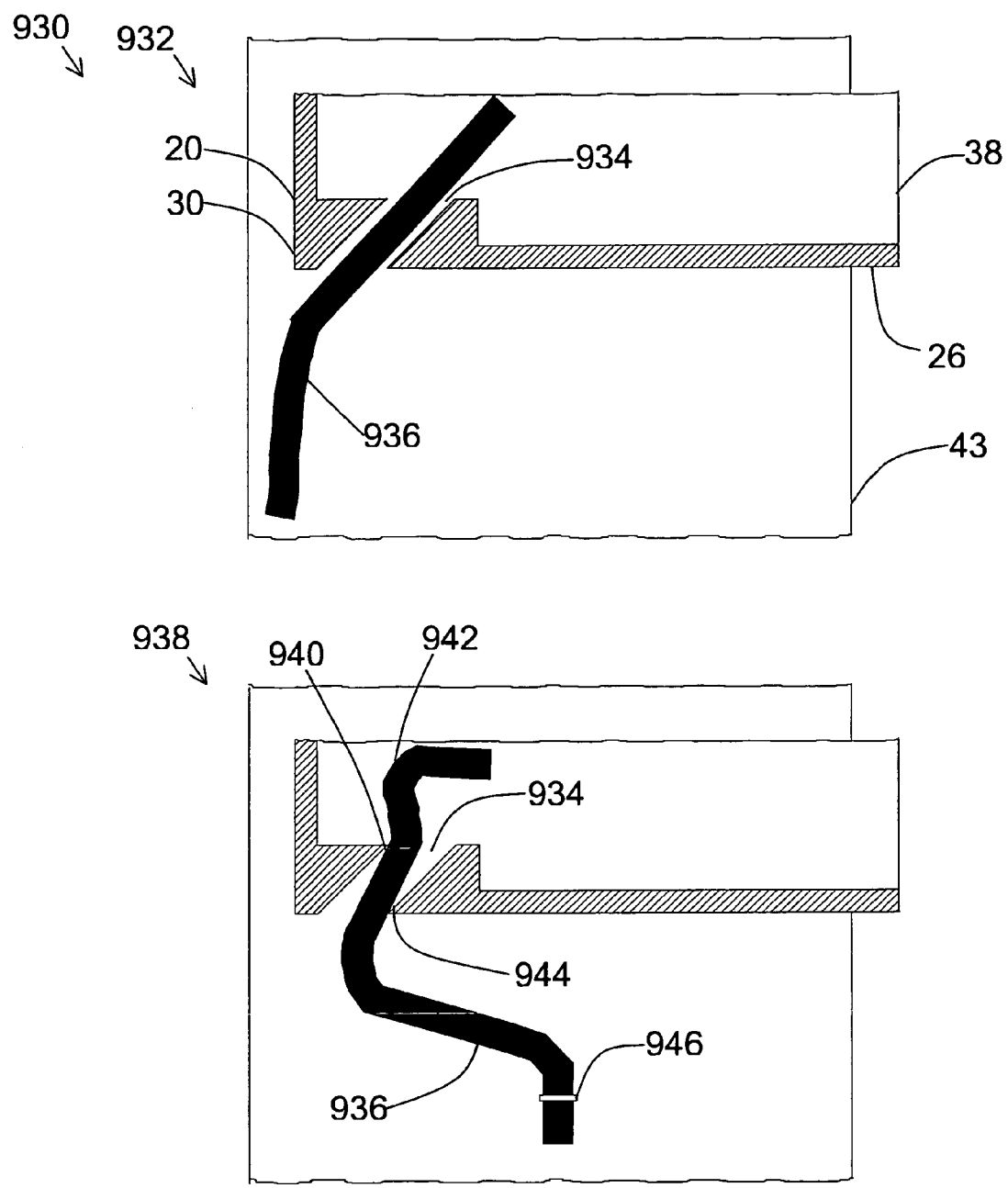
FIG. 25 is a cross-sectional side view in accordance with the cable-securing embodiment of the invention shown in FIG. 24.

FIG. 25 is a detailed cross sectional view of the cable-securing feature (930). The two views (932, 938) show the lower section of box (10) mounted to a structural member (43). Top view (932) shows cable (936) inserted into oblique cavity (934). Because the oblique cavity (934) is slanted toward the front (38) of the box (10), insertion of cable (936) into box (10) and pulling excess cable for a service loop through the front (38) is easy to accomplish. Bottom view (938) represents the final installation position of the cable (936) in box (10). A portion (942) of cable (936) is pushed to the back of the box (10) for service loop storage and attachment of the cable (946) to the center of the structural member (43) with an electrical staple (946), as required by National Electric Code. The oblique cavity (934) results in a smaller opening through the vertical plane. This self-retention method of securing the cable allows a cable to be grasped and held in place by the pointed fingers (940, 944) formed by the top and bottom of the oblique cavity (934) when the cable is in the vertical position.

Figure 26:
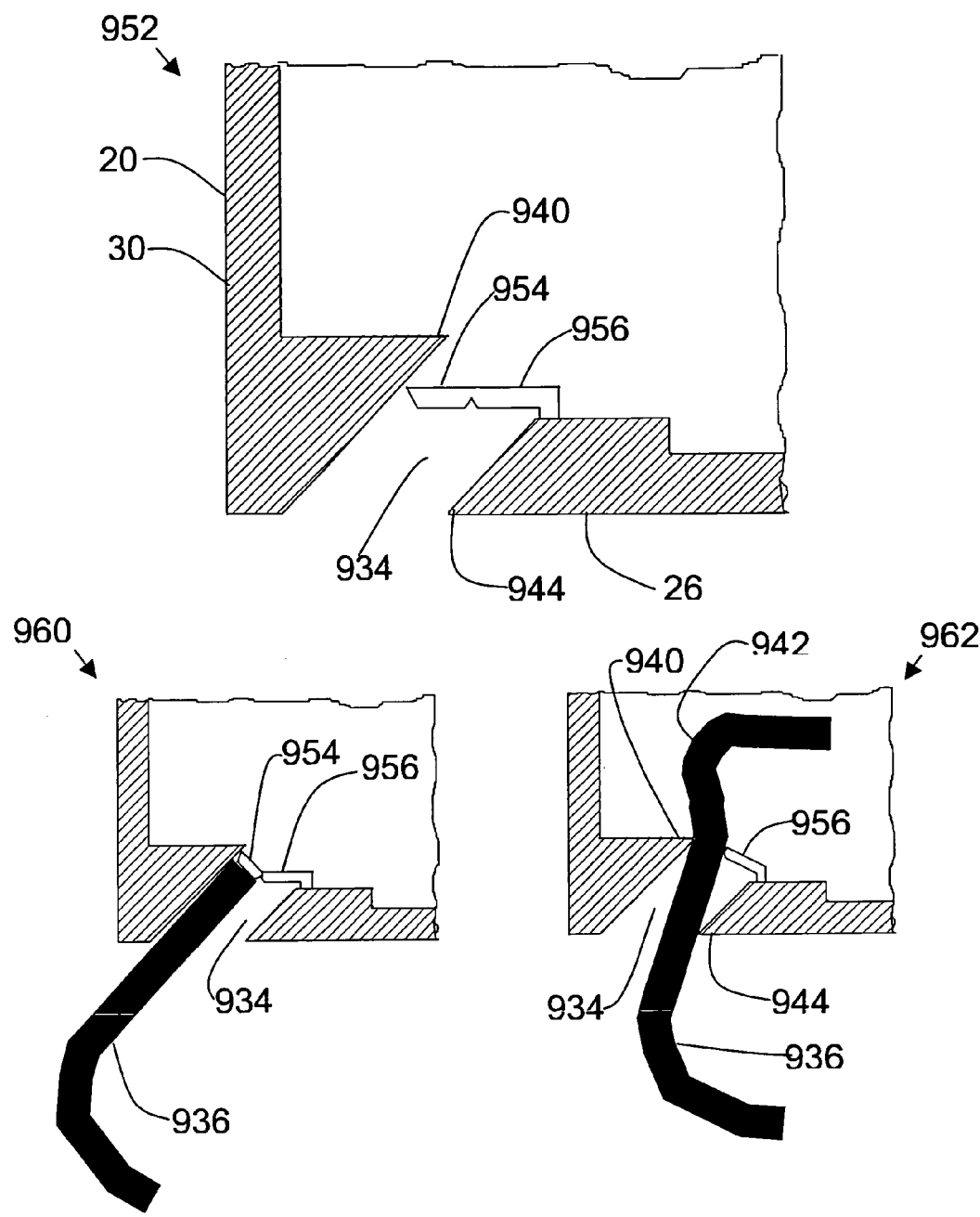
FIG. 26 is a cross-sectional side view of another embodiment of the cable-securing embodiment shown in FIG. 25 of the invention.

FIG. 26 is a detailed cross sectional view of the cable-securing feature (930) with the addition of a retaining finger (956). In plan view, the width of the retaining finger is the same as the width of the oblique cavity, except for slight tolerances to allow necessary clearance for movement of the retaining finger. The addition of the retaining finger (956) to cable-securing feature (930) results in a more robust securing feature. The retaining finger (956) provides positive vertical placement and retention of cable (936) inside the box (10), instead of depending on the portion (942) of cable (936) being pushed the back of the box (10) for service loop storage.

The three views (952, 960, 962) show the lower back section of box (10). Top view (952) shows the oblique cavity (934) with the addition of the retaining finger (956). This retaining finger (956) includes a frangible break away tip (954) sized slightly smaller than the smallest diameter cable to be used thereby allowing a retaining finger (956) that can facilitate larger cables more easily. Bottom left-hand view (960) shows cable (936) inserted into oblique cavity (934) at the point where frangible breakaway tip (954) is deflected to the breakaway position. Bottom right-hand view (962) represents the final installation position of the cable (936) in box (10) with retaining finger (956) fully engaged.

Figure 27:
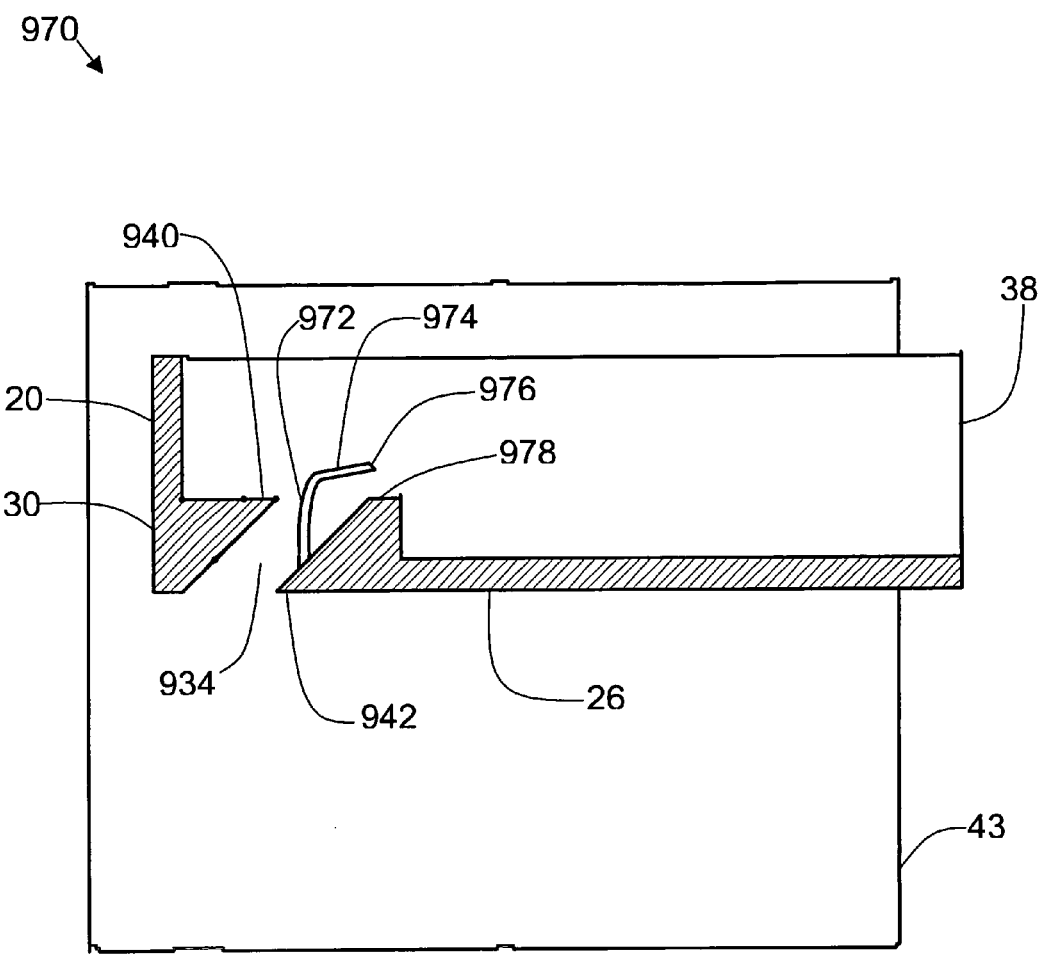
FIG. 27 is cross sectional side view of another embodiment of the cable-securing embodiment shown in FIG. 25 of the invention.

FIG. 27 is a detailed cross sectional view of the cable-securing feature (930) with the addition of a spring retaining finger (972). In plan view, the width of the retaining finger is the same as the width of the oblique cavity, except for slight tolerances to allow necessary clearance for movement of the spring retaining finger. The addition of the spring retaining finger (972) to cable-securing feature (930) results in a more robust securing feature, which easily facilitates the use of different sizes of cable. The spring retaining finger (972) provides positive vertical placement and retention of cable (936) inside the box (10), instead of depending on the portion (942) of cable (936) being pushed the back of the box (10) for service loop storage.

Figure 28:
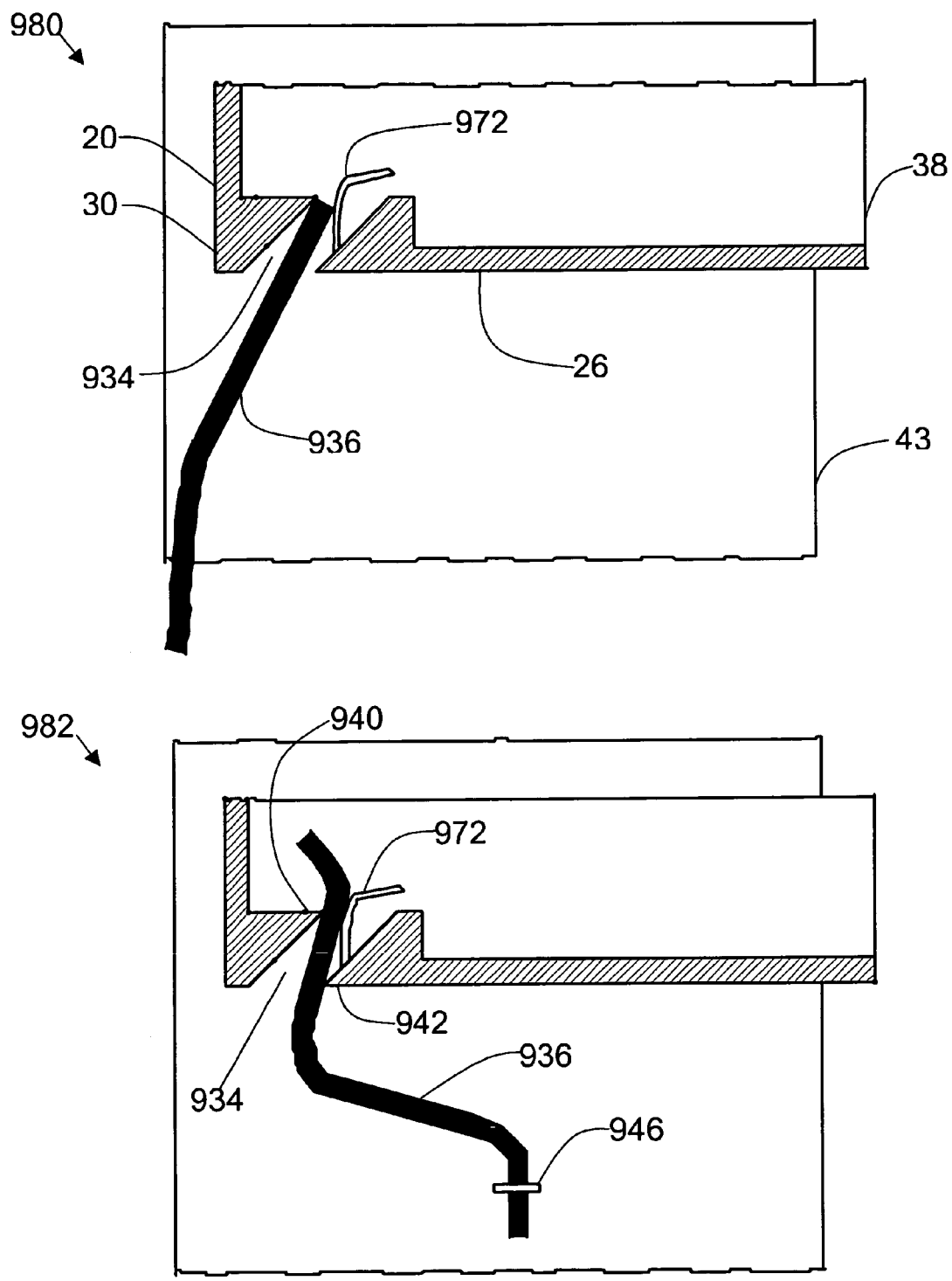
FIG. 28 is another cross sectional side view of FIG. 27 of the invention.

FIG. 28 is a detailed cross sectional view of the cable-securing feature (930) with the addition of a spring retaining finger (972). The two views (980, 982) show the lower section of box (10) mounted to a structural member (43). Top view (980) shows cable (936) inserted into oblique cavity (934) and engaging the spring retaining finger (972). Bottom right-hand view (962) represents the final installation position of the cable (936) in box (10) with spring retaining finger (972) in the engaged position to retain the cable in the vertical position.

Figure 29:
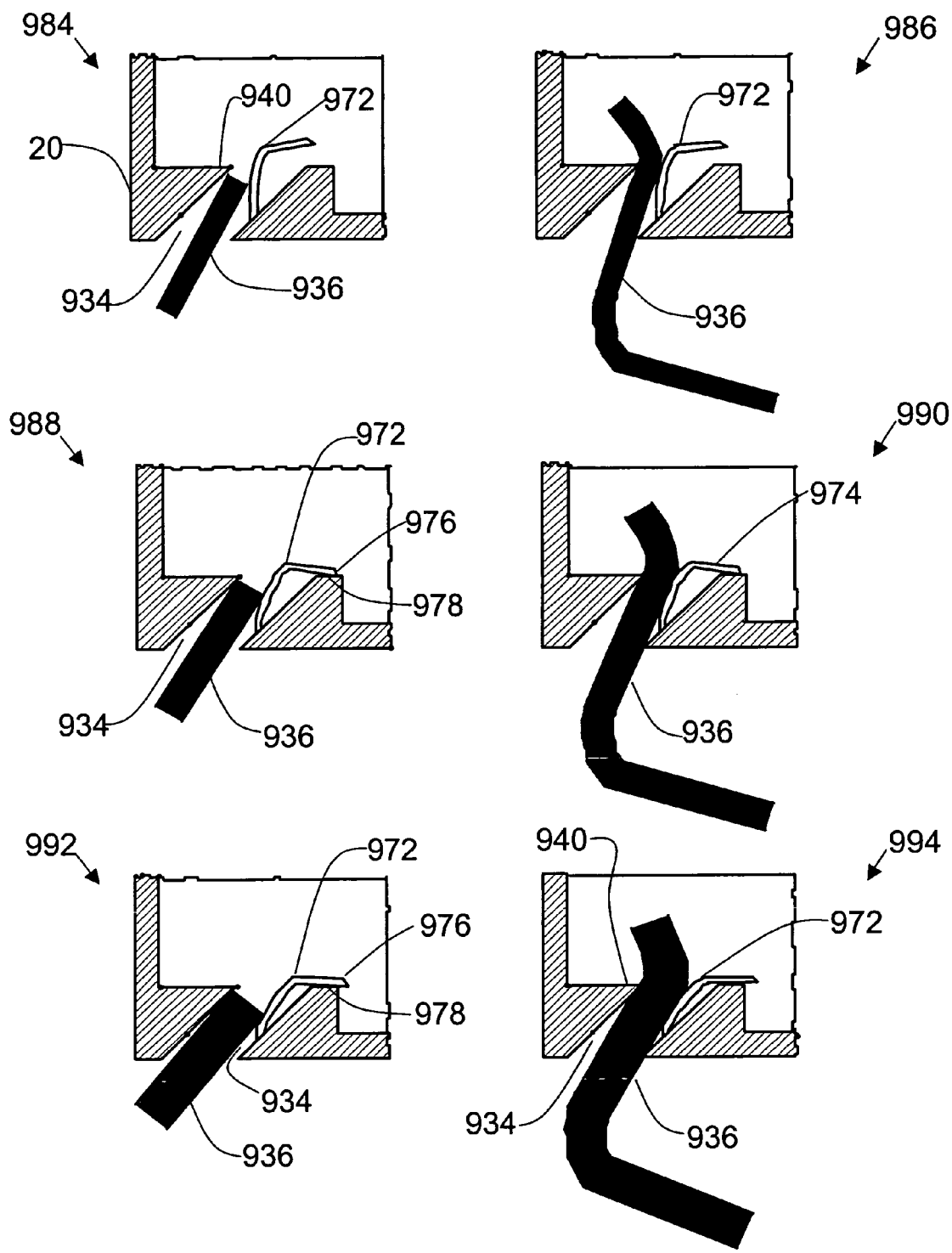
FIG. 29 is another cross sectional side-view of FIG. 27 of the invention.

FIG. 29 is a detailed cross sectional view of the cable-securing feature (930) with the addition of a spring retaining finger (972). The six views (984, 986, 988, 990, 992, 994) show the lower back section of box (10). The left-hand views (984, 988, 992) show a cable (936) inserted into oblique cavity (934) and engaging the spring retaining finger (972). The right-hand views (986, 990, 994) represent the final installation position of the cable (936) in box (10) with spring retaining finger (972) in the engaged position to retain the cable in the vertical position. The top views (984, 986) show the use of the smallest size cable (936). Middle views (988, 990) show the use of a cable (936) twice the size of the smallest cable. Bottom views (992, 994) show use of a cable three times the size of the smallest cable. The design represented herein recognizes that the resilience of plastic to return to and retain its previous position may be compromised when overextended, thereby limiting the amount of retention.

This plastic spring design allows the smaller cable shown in views (984, 986) to be retained by the reflex action provided by the spring plastic finger (972). When a cable two times the size is used, as shown in views (988, 990), the spring cable finger (972) tip (976) engages the top surface (978) of the bottom of the box adjacent to the oblique cavity (934), which allows the finger extension (974) to provide the plastic reflex action needed for retention of the cable (936) towards the vertical position. When a cable three times the size is used, as shown in views (992, 994), the spring cable finger (972) tip (976) engages the top surface (978) of the bottom of the box adjacent to the oblique cavity (934), and then bends under pressure within the oblique cavity (934) taking up the remaining gap and providing the retention needed to engage the pointed finger (940) with the cable (936).

The advantages of the slanted cable attachment feature include: an easy method to secure cables within the junction box and the ability to secure several commonly used sizes of cable equally well.

The junction box integrated design embodies several individual attributes, which when combined, build upon each other allowing the universal junction box to function in several different types of applications. The invention has been described in detail with particular reference to certain preferred embodiments thereof. It will be understood that variations in modifications can be affected within the spirit and scope of the present invention.

The invention claimed is:

1. A universal junction box comprising:
   (a) a continuous peripheral wall forming a top, a bottom and opposite sides of the junction box with the wall having an internal side and an external side, and defining an open planar front facet;
   (b) an alignment tab (41) associated with one of the opposite sides, the alignment tab being set back from the open planar front facet and extending out at a right angle from a plane that includes the external side of the peripheral wall such that the alignment tab is oriented in a plane parallel to the planar front facet; and
   (c) the box further including a plurality of alternative mounting structures for mounting the junction box to a structural member, the alternative mounting structures including at least two of
      (i) a mounting tab (40) connected by a frangible seam (45) to an edge of the box and extending vertically from the external surface in coplanar alignment with one of the opposite sides of the junction box, the mounting tab having openings to allow the passage of a fastener into the structural member,
      (ii) at least one elongated mounting aperture (42) in one of the opposite sides of the junction box to allow the passage of a fastener into the structural member, the elongated aperture extending generally normal to the plane of the open front facet of the box,
      (iii) a cavity (109) in one of the opposite sides of the junction box obliquely angled from the plane of the one opposite side to allow the angled entry of a fastener through the one opposite side and into structural member, and
      (iv) nail gripping passages (112, 118) in each of the opposite sides of the junction box to allow passage of a nail through the box and into the structural member.

2. The universal junction box of claim 1, wherein the mounting structure comprises a pair of the mounting tabs, one extending from each of a top and bottom edge of one of the opposite sides of the junction box and each mounting tab including an alignment tab extending out from a forward edge of each mounting tab.

3. The universal junction box of claim 1, further comprising an integral fastening lug on the internal side, the fastening lug defining a fastener-engaging cavity, and the internal fastening lug defining at least two attachment openings, wherein the attachment openings are non-collinear.

4. The universal junction box of claim 3, wherein the fastening lug includes a pull string anchor slot adjacent to the internal side of the peripheral wall, the anchor slot further comprising a pull string engager.

5. The universal junction box of claim 1, further comprising a conduit attachment comprising:
   (a) an opening in the peripheral wall to accommodate the passage of a conduit, the opening surrounded by an edge; and
   (b) a recess in the peripheral wall adjacent the edge, the recess providing a conduit engaging portion.

6. The universal junction box of claim 1, further comprising:
   (a) wallboard attachment means including at least one slot in the external side and a channel.

7. The universal junction box of claim 1, further comprising:
   (a) an integral rearward facing fastening lug extending from the peripheral wall, the lug comprising a first fitting for attaching a rear extension to the peripheral wall, the rear extension comprising:
      (i) a rear continuous peripheral wall with an internal side and an external side, and defining at least one planar facet; and
      (ii) a second integral fastening lug extending from the rear peripheral wall in alignment with the first lug and comprising a second fitting for attaching the rear extension.

8. A universal junction box comprising:
   (a) a continuous peripheral wall forming a top, a bottom and opposite sides of the box with the wall having an internal side and an external side, and at least one planar facet of the peripheral wall further defining a front opening;
   (b) a pair of spaced apart alignment tabs (41a, 41b) associated with one of the opposite sides of the box, the alignment tabs being set back from the front opening and extending out at a right angle from a plane that includes the external side of the peripheral wall such that the alignment tabs each are oriented in a plane parallel to the plane of the front opening;
   (c) an integral fastening lug, the fastening lug defining a cylindrical fastener-engaging cavity (34b) within the peripheral wall, extending from the peripheral wall and including an anchor slot (192) receiving and holding a pull string (196);
   (d) a mounting aperture means (42) comprising at least one set of parallel channels (92, 96) in at least one of the opposite sides allowing for the attachment of the box to a structural member, the channel terminating at an ending aperture (94, 98); and
   (e) the box having a wallboard attachment means (130) comprising at least one slot (132, 134) in the external side, a channel (138) and a clip (140a, 140b, 140c) sized to engage the slot and the channel.

9. The universal junction box of claim 8, further including cable securing means comprising:
   (a) a slanted oblique cavity in the internal side;
   (b) a spring extending from the peripheral wall; and
   (c) a conduit attachment means defining an opening in the peripheral wall having an edge at least partially surrounding the opening and a recess adjacent the edge.

10. The universal junction box of claim 8, the peripheral wall further defining at least one slanted oblique engaging cavity In the peripheral wall and at least three collinear openings in the peripheral wall, and comprising a conduit attachment means defining an opening in the peripheral wall having an edge surrounding the opening and a recess adjacent the edge.

* * * * *